(12) United States Patent
Mizuta

(10) Patent No.: US 10,969,244 B2
(45) Date of Patent: Apr. 6, 2021

(54) SEMICONDUCTOR DEVICE

(71) Applicant: RENESAS ELECTRONICS CORPORATION, Tokyo (JP)

(72) Inventor: Asaki Mizuta, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 209 days.

(21) Appl. No.: 16/355,406

(22) Filed: Mar. 15, 2019

(65) Prior Publication Data

US 2019/0293453 A1    Sep. 26, 2019

(30) Foreign Application Priority Data

Mar. 23, 2018    (JP) .............................. JP2018-056353

(51) Int. Cl.
  *G01D 5/14*        (2006.01)
  *G06F 3/041*       (2006.01)
  *G01D 5/20*        (2006.01)
  *G01D 5/24*        (2006.01)

(52) U.S. Cl.
  CPC ................. *G01D 5/14* (2013.01); *G01D 5/20* (2013.01); *G01D 5/24* (2013.01)

(58) Field of Classification Search
  CPC ...... G01R 19/10; G01R 31/3187; G01D 5/14; G01D 5/20; G01D 5/24; G06F 3/046; G06F 3/0418
  See application file for complete search history.

(56) References Cited

U.S. PATENT DOCUMENTS

| 6,841,771 B2 | 1/2005 | Shimizu |
| 10,019,233 B2 | 7/2018 | Hirai et al. |
| 2005/0116769 A1* | 6/2005 | Tei ...................... H03F 3/45475 330/9 |
| 2009/0140802 A1* | 6/2009 | Kitagawa ............ H03M 1/0663 330/9 |

FOREIGN PATENT DOCUMENTS

| JP | 2002-353495 A | 12/2002 |
| JP | 2003-114243 A | 4/2003 |
| JP | 2017-126116 A | 7/2017 |

* cited by examiner

*Primary Examiner* — Minh N Tang
(74) *Attorney, Agent, or Firm* — McDermott Will & Emery LLP

(57) ABSTRACT

A switch group selectively outputs a signal input from IC terminals and a reference voltage. Another switch group selectively outputs a signal input from IC terminals and a reference voltage. A differential amplifier amplifies a differential voltage between a signal output from the switch group and a signal output from the another switch group. The switch group and the another switch group include the same number of switches. When to select any of signals input from the IC terminals in the switch group, a reference voltage is selected in the another switch group. When to select any of signals input from the IC terminals in the another switch group, a reference voltage is selected in the switch group.

20 Claims, 12 Drawing Sheets

SEMICONDUCTOR DEVICE

CROSS-REFERENCE TO RELATED APPLICATIONS

The disclosure of Japanese Patent Application No. 2018-056353 filed on Mar. 23, 2018 including the specification, drawings and abstract is incorporated herein by reference in its entirety.

BACKGROUND

The present invention relates to a semiconductor device, and relates, for example, to a semiconductor device to which a sensor is coupled.

Japanese Unexamined Patent Application Publication No. 2017-126116 discloses a position detection device which detects an indicated position using a pen. The position detection device disclosed in Japanese Unexamined Patent Application Publication No. 2017-126116 has a plurality of loop coils and a voltage detection amplifier. The loop coils are provided for receiving a signal with a frequency transmitted by a pen as a position detection device. The amplifier detects the signal received by the loop coils. The plurality of loop coils are coupled to the voltage detection amplifier through a reception channel selection switch group. The reception channel selection switch group has a plurality of switches respectively corresponding to the loop coils. One ends of the loop coils are coupled to a reference voltage source, while the other ends thereof are coupled to one input terminal of the voltage detection amplifier through respectively corresponding switches. A reference voltage output by the reference voltage source is input to the other input terminal of the voltage detection amplifier.

In the reception channel selection switch group, one of a plurality of switches is controlled to be ON, while the rest of switch(es) is controlled to be OFF. By so doing, one of the plurality of loop coils is coupled to the voltage detection amplifier. The voltage detection amplifier detects and amplifies a reception signal received by the coupled loop coil. In the position detection device, the reception signal received and amplified by the voltage detection amplifier is sampled by a sampling circuit, and input to a signal process arithmetic circuit. The signal process arithmetic circuit performs various arithmetic operations including DFT (Discrete Fourier Transform) for the sampling data of the reception signal, and calculates the amplitude and phase of the reception signal.

Japanese Unexamined Patent Application Publication No. 2003-114243 discloses a battery pack voltage detection circuit. The battery pack voltage detection circuit disclosed in Japanese Unexamined Patent Application Publication No. 2003-114243 has a resistance element circuit formed from a predetermined number of resistance elements, a differential amplifier having a pair of input terminals, and a multiplexer. In the resistance element circuit, one ends of the predetermined number of resistance elements are individually coupled to the electrode terminals of a plurality of battery modules which are coupled in series to form a battery pack. The multiplexer has a plurality of switching elements for individually coupling the other ends of the resistance elements and input ends of the differential amplifier. The multiplexer controls a pair of switching elements to be ON in a sequential order, and outputs a voltage of each battery module sequentially to the differential amplifier.

SUMMARY

In Japanese Unexamined Patent Application Publication No. 2017-126116, if a source voltage variation occurs, this variation is transmitted to one input terminal of the voltage detection amplifier, through a power source of a control circuit (driving circuit) of each switch included in the reception channel selection switch group. At this time, a reference voltage source is coupled to the other input terminal of the voltage detection amplifier. Thus, the voltage of the other input terminal is not effected by the voltage variation. In this case, the voltage of one input terminal is varied. This results in generating an unintentional signal in the output of the voltage detection amplifier. This unintentional signal causes error detection.

In Japanese Unexamined Patent Application Publication No. 2003-114243, a plurality of resistance elements are coupled to both input terminals of the differential amplifier. Because different numbers of resistance elements are coupled to the input terminals of the differential amplifier, when a source voltage variation is transmitted from the control circuit of the switch, an unintentional signal is generated in the output of the differential amplifier.

Japanese Unexamined Patent Application Publication No. 2002-353495 discloses an optical coupling device which can improve a CMRR (Common Mode Rejection Ratio). Japanese Unexamined Patent Application Publication No. 2002-353495 discloses a technique for improving the CMRR by providing a dummy photodiode adjacent to the photodiode, in the optical coupling device to be realized as a photo coupler. Though Japanese Unexamined Patent Application Publication No. 2002-353495 discloses a configuration for improving the CMRR only for one photo diode as a sensor, it does not disclose any configuration for improving the CMRR for a plurality of sensors.

Any other objects and new features will be apparent from the descriptions of this specification and the accompanying drawings.

According to one embodiment, a semiconductor device has a first switch group which selectively outputs a signal input from the first group of sensor coupling terminals and a reference voltage, from an output terminal; a second switch group which selectively outputs a signal input from the second group of sensor coupling terminals and the reference voltage, from an output terminal; a first input terminal which is coupled to the output terminal of the first switch group; a second input terminal which is coupled to the output terminal of the second switch group; and a differential amplifier which amplifies and outputs a differential voltage between two input terminals. The number of switches included in the first switch group is equal to a number of switches included in the second switch group. When to select a sensor included in the first group of sensors, a reference voltage is selected in the second switch group. When to select any one of signals input from the second group of sensor coupling terminals in the second switch group, a reference voltage is selected in the first switch group.

According to the one embodiment, in a semiconductor device to which a plurality of sensors are coupled, even when a power source voltage variation occurs, it is possible to suppress detection of an unintentional signal.

DETAILED DESCRIPTION

Figure 1:
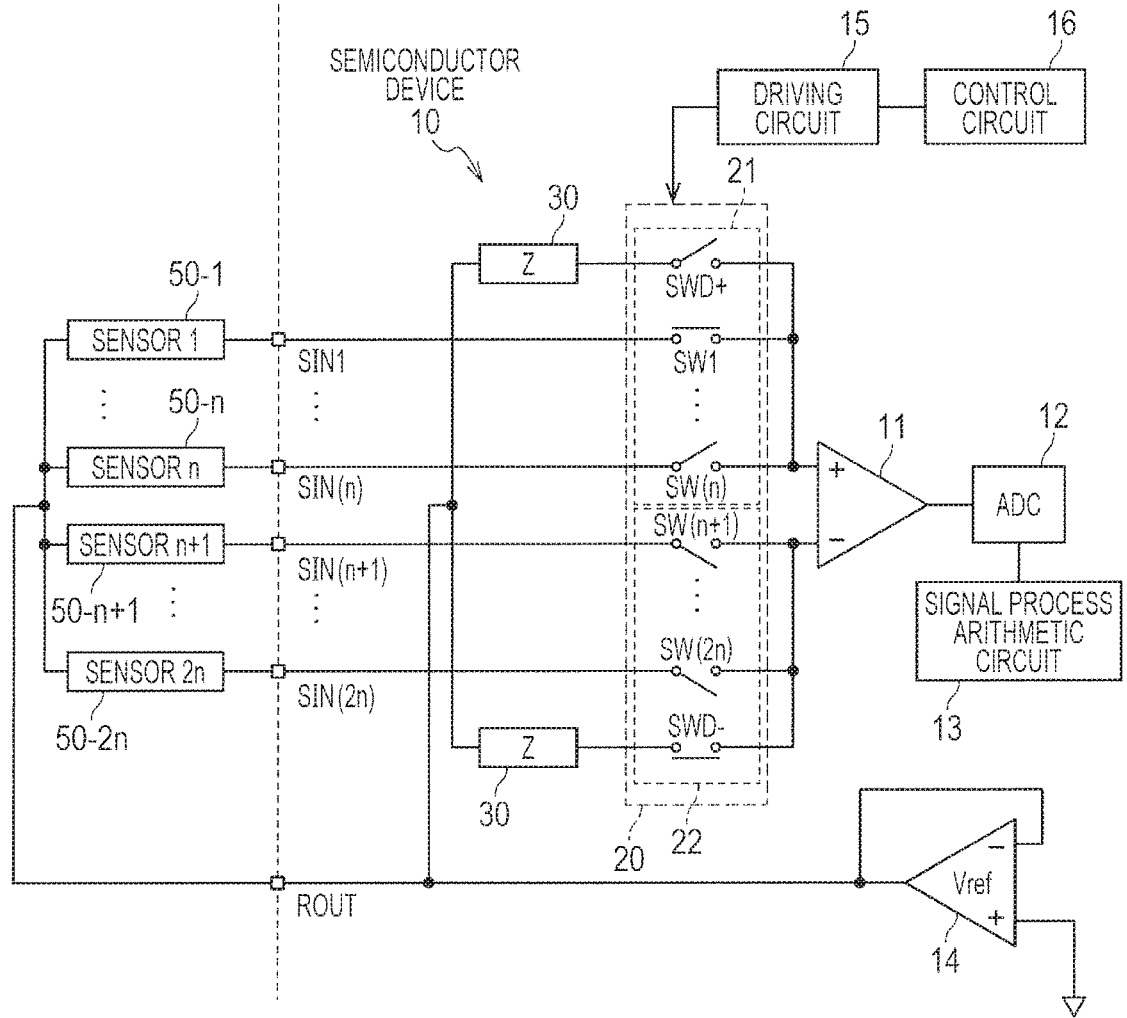
FIG. 1 is a block diagram illustrating a semiconductor device according to a first embodiment.

Descriptions will now specifically be made to preferred embodiments to which means for solving the above problem is applied, by reference to the accompanying drawings. For easy descriptions, the following descriptions and drawings are appropriately omitted or simplified. Those elements illustrated in the drawings as functional blocks for performing various processes may be configured using a CPU (Central Processing Unit), a memory, or any other circuits, in hardware, while they are realized by a program loaded in the memory in software. It is obvious for the skilled in the art that these functional blocks can be realized in any form by only the hardware, the software, or a combination of them, and thus will not be limited to any of them. In the accompanying drawings, the same constituent elements are identified by the same reference numerals, and will not be described over and over, as needed.

The above-described programs are stored using various types of non-transitory computer readable mediums, and can be supplied to a computer. The non-transitory computer readable mediums include various types of substantial recording mediums. Examples of the non-transitory computer readable mediums include a magnetic recording medium (for example, a flexible disk, a magnetic tape, a hard disk), a magneto-optical recording medium (for example, a magneto-optical disk), a CD-ROM (a Read Only Memory) CD-R, a CD-R/W, and a semiconductor memory (for example, a mask ROM, a PROM (Programmable ROM), an EPROM (Erasable PROM), a flash ROM, a RAM (Random Access Memory)). The program may be supplied to the computer, using any of the various types of non-transitory computer readable mediums. Examples of the non-transitory computer readable mediums include an electrical signal, an optical signal, and an electromagnetic wave. The non-transitory computer readable mediums can supply a program to the computer, through a wired communication path, such as an electric wire and an optical fiber, or a wireless communication path.

In the following preferred embodiments, if necessary for convenience sake, descriptions will be made to divided plural sections or preferred embodiments, however, unless otherwise specified, they are not mutually irrelevant, but one is in relations of modifications, details, supplementary explanations of a part or whole of the other. In the following preferred embodiments, in the case of reference to the number of elements (including the quantity, numeric value, amount, range), unless otherwise specified and unless clearly limited in principle, the present invention is not limited to the specified number, and a number over or below the specified one may be used.

Further, in the following preferred embodiments, the constituent elements (including the operation steps) are not necessarily indispensable, unless otherwise specified and unless considered that they are obviously required in principle. Similarly, in the following preferred embodiments, in the reference of the forms of the constituent elements or the positional relationships, they intend to include those approximating or similar substantially to the forms and like, unless otherwise specified and unless considered that they are obviously not required in principle. This is also true of the foregoing numerals (the quantity, numeric value, amount, range).

First Embodiment

FIG. 1 illustrates a semiconductor device according to a first embodiment. A semiconductor device 10 has a differential amplifier 11, an ADC (Analog to Digital Converter) 12, a signal process arithmetic unit 13, a reference voltage source 14, a driving circuit 15, a control circuit 16, a switch circuit 20, and a dummy impedance circuit 30. To the semiconductor device 10, a 2n-number of sensors 50-1 to 50-2n are coupled, when "n" is an integer equal to or greater than 1. The semiconductor device 10 is used for detecting the position of a target object to be measured, by receiving an electrical signal which is generated a mutual interaction (electromagnetic induction or electrostatic capacity) between the sensors 50-1 to 50-2n.

The reference voltage source 14 generates a reference voltage. The reference voltage source 14 may be of an overall feedback type, in which a reference potential is given to, for example, a positive input terminal. The reference voltage generated by the reference voltage source 14 is output from an IC (Integrated Circuit) terminal ROUT as a reference voltage output terminal to the sensors 50-1 to 50-2n. The reference voltage generated by the reference voltage source 14 is also output to the dummy impedance circuit 30. The reference voltage source 14 is not necessarily included in the semiconductor device 10, and may be provided outside the semiconductor device 10. In this case, a reference voltage may be input to the dummy impedance circuit 30 through a reference voltage input terminal.

One ends of the sensors 50-1 to 50-2n are coupled to IC terminals SIN1 to SIN2n as sensor coupling terminals. The other ends of the sensors 50-1 to 50-2n are gathered in one, and coupled to the reference voltage source 14 through the IC terminal ROUT. The sensors 50-1 to 50-2n are configured as the same type of sensors. The sensors 50-1 to 50-2n are configured as sensors detecting, for example, a frequency signal. The sensors 50-1 to 50-2n are configured using, for example, loop coils.

The switch circuit 20 includes a switch group 21 and a switch group 22. The switch group 21 has an n-number of switches (sensor coupling switches) SW1 to SWn corresponding to the n-number of sensors 50-1 to 50-$n$ and a switch (bias voltage switch) SWD+ corresponding to the reference voltage. One ends of the switches SW1 to SWn are respectively coupled to the IC terminals SIN1 to SINn, the other ends thereof are coupled to one input terminal (positive input terminal) of the differential amplifier 11. One end of the switch SWD+ is coupled to the output of the reference voltage source 14 through the dummy impedance circuit 30, and the other end thereof is coupled to the positive input terminal of the differential amplifier 11. The switch group 21 selectively outputs a signal input from 50-1 to 50-*n* through the IC terminal SIN1 to SINn and a reference voltage input from the reference voltage source 14 through the dummy impedance circuit 30.

The switch group 22 has an n-number of switches (sensor coupling switches) SWn+1 to SW2n corresponding to an n-number of sensors 50-*n*+1 to 50-2n and a switch (bias voltage switch) SWD− corresponding to a reference voltage. One ends of the switches SWn+1 to SW2n are coupled respectively to IC terminals SINn+1 to SIN2n, while the other ends thereof are coupled to the other input terminal (negative input terminal) of the differential amplifier 11. One end of the switch SWD− is coupled to the output of the reference voltage source 14 through the dummy impedance circuit 30, while the other end thereof is coupled to the negative input terminal of the differential amplifier 11. The switch group 22 selectively outputs a signal input from the n-number of sensors 50-*n*+1 to 50-2n through the IC terminals SINn+1 to SIN2n and a reference voltage input from the reference voltage source 14 through the dummy impedance circuit 30. FIG. 1 illustrates an example in which the switch group 21 is coupled to the positive input terminal, and the switch group 22 is coupled to the negative input terminal. However, instead, the switch group 21 may be coupled to the negative input terminal, and the switch group 22 may be coupled to the positive input terminal.

As described above, the switch group 21 has an n+1-number of switches SW1 to SWn and SWD+. The switch group 22 has the n+1-number of switches SWn+1 to SW2n and SWD−. In this embodiment, the switch groups 21 and 22 have the same number of switches. Each of the switches SW1 to SW2n, SWD+, and SWD− included in the switch groups 21 and 22 is configured using, for example, a field effect transistor. The field effect transistors used for the switch groups 21 and 22 have the same sizes, for example, in their gate width and the gate length. In other words, the switches SW1 to SW2n, SWD+, and SWD− included in the switch groups 21 and 22 all are to have the same electric characteristics.

The driving circuit 15 drives the switches in the switch groups 21 and 22. The driving circuit 15 includes a logical circuit, for example, an inverter or a buffer, and drives the gate of the field effect transistor configured as each switch. The control circuit (switch control circuit) 16 controls selection (ON) and non-selection (OFF) of each switch in the switch groups 21 and 22, through the driving circuit 15. The control circuit 16 controls any one of the switch SW1 to SW2n to be ON, and controls the rest to be OFF. The control circuit 16 controls one of the switches SWD+ and SWD− to be ON, and controls the other switch to be OFF. The sensor corresponding to the ON switch of the switches SW1 to SW2n represents a sensor to be selected.

The control circuit 16 controls the switch SWD− to be ON in the switch group 22, when turning ON any of the switches SW1 to SWn in the switch group 21. That is, the control circuit 16 controls the switch group 22 to select a reference voltage, when to select any of the signals input from the IC terminals SIN1 to SINn in the switch group 21. When the control circuit 16 controls the switch SWD+ to be ON in the switch group 21, when turning ON any of the switches SWn+1 to SW2n in the switch group 22. That is, the control circuit 16 controls the switch group 21 to select a reference voltage, when to select any of the signals input from the IC terminals SINn+1 to SIN2n in the switch group 22. The control circuit 16 sequentially selects the sensors 50-1 to 50-2n, while switching the sensors one by one in a predetermined order. This selection order is arbitrary, and is not particularly restricted.

The differential amplifier 11 amplifies and outputs a differential voltage between a signal (voltage) output from an output terminal of the switch group 21 and a signal output from an output terminal of the switch group 22. When any of the signals input from the IC terminals SIN1 to SINn is selected in the switch group 21, the differential amplifier 11 amplifies a differential voltage between the selected signal and a reference voltage input through the dummy impedance circuit 30 and the switch SWD−. When any of the signals input from the IC terminals SINn+1 to SIN2n is selected in the switch group 22, the differential amplifier 11 amplifies a differential voltage between the selected signal and a reference voltage input through the dummy impedance circuit 30 and the switch SWD+.

In this case, the sensors 50-1 to 50-2n are provided between the switches SW1 to SW2n and the reference voltage source 14, while the dummy impedance circuit 30 is provided between the switches SWD+ and SWD− and the reference voltage source 14. The dummy impedance circuit 30 is arranged to equalize the impedance between the switches SWD+ and SWD− and the reference voltage source 14 and the impedance between the switches SW1 to SW2n and the reference voltage source 14. The impedance value of the dummy impedance circuit 30 is set to a value which is obtained by adding an impedance component of an interaction between the sensors and a target object to be measured to an impedance value of the sensors, instead of the same impedance value as the impedance value of the sensors themselves. When there is no interaction therebetween, or when there is only a slight effect of the interaction, the impedance value of the dummy impedance circuit 30 is set to the same value as the impedance value of the sensors themselves.

The impedance value of the dummy impedance circuit 30 is set to a value which is obtained by adding the impedance component generated due to mutual induction to the impedance value of the sensors. For example, in the position detection device disclosed in Japanese Unexamined Patent Application Publication No. 2017-126116, a loop coil is used in the sensor, and the position detection device performs position detection using electromagnetic induction between the position indication device as a target object to be measured and the loop coil. In this case, mutual induction M occurs between the sensors and the position indication device. When the impedance value of the dummy impedance circuit 30 is set as a resultant value of adding the mutual induction M to the impedance value of the sensors, it is possible to having uniform impedances between both input terminals of the differential amplifier 11 (voltage detection amplifier in Japanese Unexamined Patent Application Publication No. 2017-126116), at the time of detecting a reception signal.

When the mutual interaction has the electrostatic capacity, the impedance value of the dummy impedance circuit 30 is set to a value obtained by adding the capacitance component generated by the mutual capacitance to the impedance value of the sensors. The impedance generated by the mutual interaction is not limited to a positive value, and may be a negative value. The impedance value of the dummy impedance circuit 30 is set to a desired impedance value in the frequency of the reception signal. The dummy impedance circuit 30 can be configured using a resistor and a capacitor, as long as it is not effected by a source voltage variation.

An ADC 12 converts an analog voltage signal output by the differential amplifier 11 into a digital signal. The ADC 12 outputs sampling data of the output signal from the differential amplifier 11 which has been converted into the digital signal to the signal process arithmetic circuit 13. The signal process arithmetic unit (signal process circuit) 13 performs a signal process for the output signal of the differential amplifier 11 which is input through the ADC 12. The signal process arithmetic unit 13 extracts a predetermined frequency component from the reception signal by performing, for example, discrete Fourier transform for the sampling data of the output signal from the differential amplifier 11, to perform various arithmetic operations.

For example, when the switch SW1 in the switch group 21 is selected and turned ON, the positive input terminal of the differential amplifier 11 is coupled to the sensor 50-1 through the switch SW1. At this time, the switch SWD− in the switch group 22 is selected and turned ON, and the negative input terminal of the differential amplifier 11 is coupled to the reference voltage source 14 through the switch SWD−. The differential amplifier 11 amplifies the reception signal received by the sensor 50-1 by a mutual interaction between the target object to be measured and the sensor 50-1. Then, the ADC 12 samples the reception signal. The signal process arithmetic circuit 13 performs various arithmetic operations including the discrete Fourier transform for the sampling data obtained by the ADC 12, thereby obtaining information including the amplitude or phase of the reception signal of the sensor 50-1.

For example, when the switch SWn+1 in the switch group 22 is selected and turned ON, the negative input terminal of the differential amplifier 11 is coupled to the sensor 50-$n$+1 through the switch SWn+1. At this time, the switch SWD+ in the switch group 21 is selected and turned ON, and the positive input terminal of the differential amplifier 11 is coupled to the reference voltage source 14 through the switch SWD+. The differential amplifier 11 amplifies a reception signal received by the sensor 50-$n$+1 by a mutual interaction between the target object to be measured and the sensor 50-$n$+1. The ADC 12 samples the reception signal. The signal process arithmetic circuit 13 performs various arithmetic operations including discrete Fourier transform for the sampling data obtained by the ADC 12, thereby obtaining information including the amplitude or phase of the reception signal of the sensor 50-$n$+1.

In this embodiment, the switches SW1 to SWn are coupled to the positive input terminal of the differential amplifier 11, and the switches SWn+1 to SW2n are coupled to the negative input terminal of the differential amplifier 11. Thus, when the switches SW1 to SWn are selected, or when the switches SWn+1 to SW2n are selected, the polarity of the reception signal output by the differential amplifier 11 is reversed. Similarly, the polarity of the sampling data of the reception signal obtained by the ADC 12 is reversed. The signal process arithmetic circuit 13 performs a reverse process for the sampling data in accordance with the selected switch, thereby enabling to have uniform polarities of the reception signals. The signal process arithmetic circuit 13 does not perform the reverse process, when any of, for example, the switches SW1 to SWn is selected, and performs the reverse process, when any of the switches SWn+1 to SW2n is selected. The relationship between the selected switch and performance/non-performance of the reverse process may be the other way round. In this manner, in a state where the same polarity is made, various arithmetic operations can be performed for the reception signal.

In this embodiment, one of the switches SW1 to SW2n is selected for a 2n-number, that is, an even number of sensors 51-1 to 50-2n. Then, the signal of the sensors 50-1 to 50-2n is input to and received by the differential amplifier 11. In this embodiment, the switch groups 21 and 22 have the same number of switches, and the same number of switches are coupled to the positive input terminal and the negative input terminal of the differential amplifier 11. The control circuit 16 selects a switch to be coupled to the IC terminals SIN1 to SINn or SINn+1 to SIN2n in one of the switch groups 21 and 22, and selects one switch to be coupled to the reference voltage source 14. That is, of the switches included in the switch groups 21 and 22 to be coupled to the positive input terminal and the negative input terminal, one switch is controlled to be ON, and the rest of the switches are controlled to be OFF.

[Equivalent Circuit]

Figure 2:
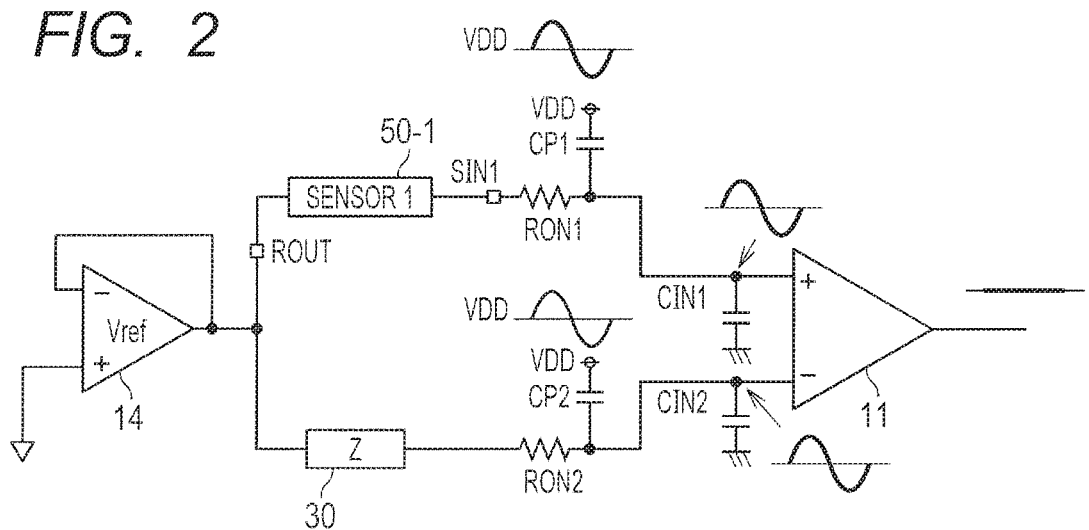
FIG. 2 is a schematic diagram illustrating the semiconductor device in an aspect.

FIG. 2 schematically illustrates an equivalent circuit of the semiconductor 10 in one aspect. The equivalent circuit illustrated in FIG. 2 corresponds to a state where the switch SW1 in the switch group 21 is selected, and also the switch SWD− in the switch group 22 is selected. A resistor RON1 illustrated in FIG. 2 represents on-resistance of a field effect transistor included in the switch SW1, while a resistor RON2 represents on-resistance of a field effect transistor included in the switch SWD−. The positive input terminal of the differential amplifier 11 is coupled to the reference voltage source 14 through the resistor RON1, the IC terminal SIN1, the sensor 50-1, and the IC terminal ROUT. On the other hand, the negative input terminal of the differential amplifier 11 is coupled to the reference voltage source 14 through the resistor RON2 and the dummy impedance circuit 30.

A capacitor CP1 illustrated in FIG. 2 represents a parasitic capacitance for a power source VDD of an "n+1-number" of switches SW1 to SWn and SWD+ coupled to the positive input terminal of the differential amplifier 11. A capacitor CP2 represents a parasitic capacitance for a power source VDD of an n+1-number of switches SWn+1 to SW2n and SWD− coupled to the negative input terminal of the differential amplifier 11. Capacitors CIN1 and CIN2 represent input capacitances for the positive input terminal and the negative input terminal of the differential amplifier 11 and a ground GND. In the switch groups 21 and 22, the resistance value of a non-selective switch is to be assumed as infinity, and a resistance component of the non-selective switch is not illustrated in the equivalent circuit illustrated in FIG. 2.

In this embodiment, the same number of switches are coupled to the positive input terminal and the negative input terminal of the differential amplifier 11. Thus, the parasitic capacitance CP1 and the parasitic capacitance CP2 are equal to each other, and the input capacitance CIN1 and the input capacitance CIN2 are equal to each other. Further, the resistors RON1 and RON2 coupled to the positive input terminal and the negative input terminal have the equal resistance value. Note that the impedance at the non-detection by the sensor 50-1, that is, the impedance of the sensor 50-1 itself differs from the impedance of the dummy impedance circuit 30. The impedance of the sensor 50-1 increases or decreases by a value corresponding to a mutual interaction with a target object to be measured, at the detection. The impedance value of the dummy impedance circuit 30 is set to the impedance at the detection, thereby having uniform impedances at the positive input terminal and the negative input terminal of the differential amplifier 11 at the detection.

In FIG. 2, let it be considered a case in which a variation occurs in the power source VDD. The variation in the source voltage is transmitted to the positive input terminal and the negative input terminal of the differential amplifier 11, through the power source of the driving circuit 15 of the switches included in the switch groups 21 and 22. In this embodiment, as described above, the positive input terminal and the negative input terminal of the differential amplifier 11 have the equal impedance. Thus, the same amount of variation is transmitted to the positive input terminal and the negative input terminal of the differential amplifier 11. The same effect of the source voltage variation is given to the positive input terminal and the negative input terminal of the differential amplifier 11, thereby canceling the effect of the source voltage variation in the output of the differential amplifier 11. Thus, any unintended signal (amplitude change) is not generated in the output of the differential amplifier 11, thus suppressing detection of the unintended signal.

[Summary]

In this embodiment, the semiconductor device 10 is coupled to the 2n-number of sensors 50-1 to 50-2n. The switch group 21 selectively outputs a signal input from the n-number of sensors 50-1 to 50-$n$ and a reference voltage to the positive input terminal of the differential amplifier 11. The switch group 22 selectively outputs a signal input from the n-number of sensors 50-$n$+1 to 50-2n and a reference voltage to the negative input terminal of the differential amplifier 11. In this embodiment, the switch groups 21 and 22 have the same number of switches. The control circuit 16 selects a reference voltage in the switch group 22, when to select any of the sensors 50-1 to 50-$n$ in the switch group 21. The control circuit 16 selects a reference voltage in the switch group 21, when to select any of the sensors 50-$n$+1 to 50-2n in the switch group 22. In this manner, it is possible substantially to equalize the variation transmitted to the positive input terminal and the negative input terminal of the differential amplifier 11, when a variation occurs in the source voltage, and also to suppress detection of any unintended signal in the output of the differential amplifier 11. Thus, in this embodiment, it is possible to enhance the tolerance (PSRR: Power Supply Rejection Ration) for a source voltage variation, and to detect a minute signal with high accuracy.

In this embodiment, the impedance value of the dummy impedance circuit 30 is set to a value obtained by adding or subtracting the impedance value by a value corresponding to a mutual interaction between the sensor and the target object to be measured, to or from the impedance value of the sensor itself. In this case, in a state where a mutual interaction occurs between the sensor and the target object to be measured, it is possible to have the uniform impedance values between the positive input terminal of the differential amplifier 11 and the negative input terminal. Thus, in a state where the sensor reacts with the target object to be measured, it is possible to suppress detection of an intended signal and to enhance detection performance of the sensors.

In this embodiment, the dummy impedance circuit 30 can be configured using a resistor and a capacitor. In this case, an advantage is that the dummy impedance circuit 30 is configured inside the semiconductor device 10. When the dummy impedance circuit 30 is configured inside the semiconductor device, unlike Japanese Unexamined Patent Application Publication No. 2002-353495, there is no need to couple a dummy sensor to the semiconductor device 10. The semiconductor device 10 does not need an IC terminal for coupling to the dummy sensor. Thus, in this embodiment, it is possible to minimize the effect to the external part of the semiconductor device 10, for example, any external component or any extra IC terminal, and to improve the PSRR characteristics.

Second Embodiment

Figure 3:
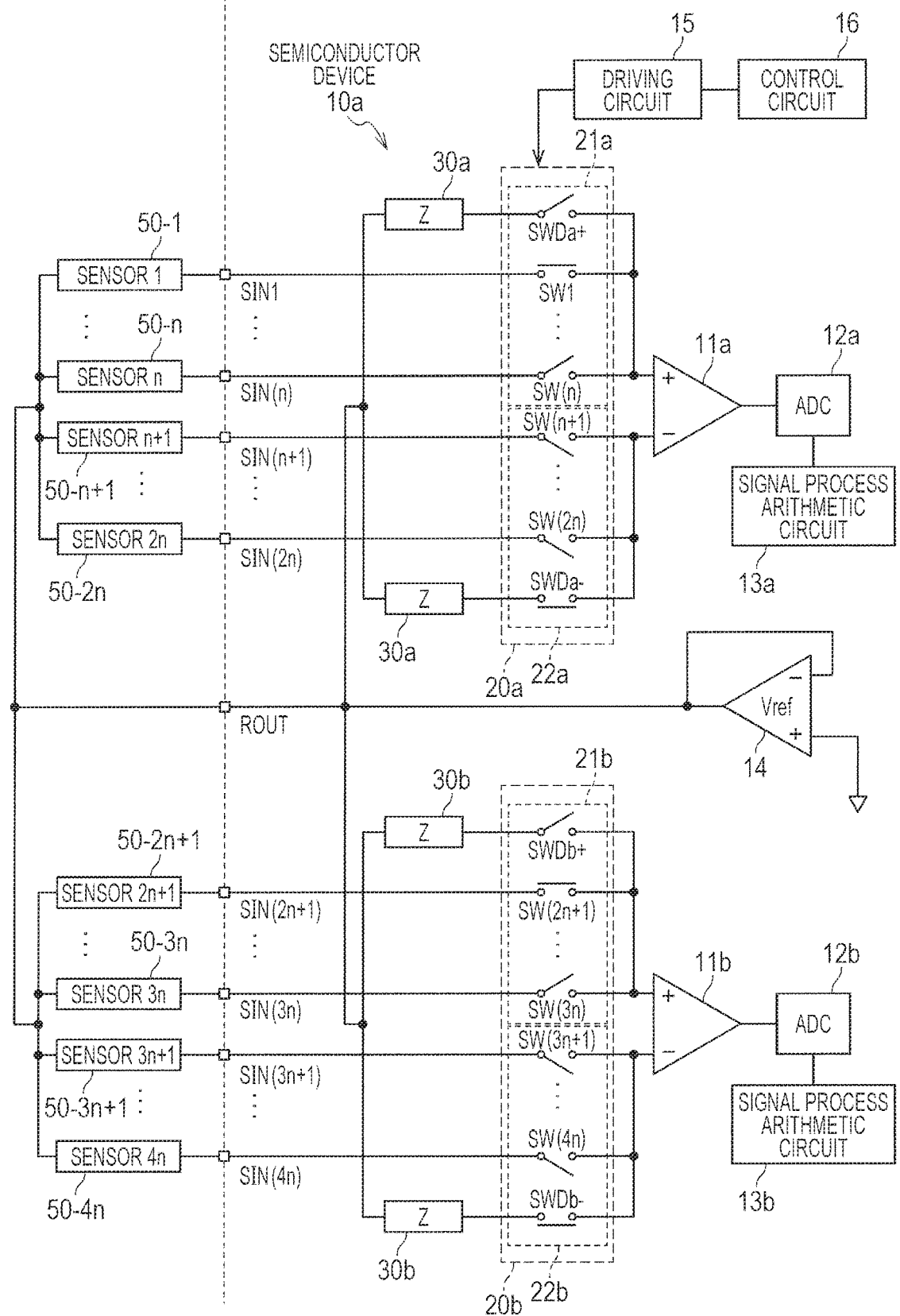
FIG. 3 is a block diagram illustrating a semiconductor device according to a second embodiment.

Descriptions will now be made to a second embodiment. FIG. 3 illustrates a semiconductor device according to the second embodiment.

The semiconductor device 10a according to this embodiment has differential amplifiers 11a and 11b, ADCs 12a and 12b, signal process arithmetic circuits 13a and 13b, a reference voltage source 14, a driving circuit 15, a control circuit 16, switch circuits 20a and 20b, and dummy impedance circuits 30a and 30b.

In this embodiment, a "4n-number" of sensors 50-1 to 50-4n are coupled to the semiconductor device 10a. The semiconductor device 10a has a configuration with two sets of the semiconductor device according to the first embodiment, as illustrated in FIG. 1. That is, each of the sets includes the differential amplifier 11, the ADC 12, the signal process arithmetic circuit 13, the switch circuit 20, and the dummy impedance circuit 30. The semiconductor device 10a may be configured with three or more sets of the above. The differential amplifier 11a, the ADC 12a, the signal process arithmetic circuit 13a, the reference voltage source 14, the driving circuit 15, a control circuit 16a, the switch circuit 20a, the dummy impedance circuit 30a, and the sensors 50-1 to 50-2a may be the same as those of the first embodiment.

One ends of the sensors 50-2n+1 to 50-4n are coupled to IC terminals SIN2n+1 to SIN4n as sensor coupling terminals. The other ends of the sensors 50-2n+1 to 50-4n are gathered in one, and coupled to the reference voltage source 14 through the IC terminal ROUT.

The switch circuit 20b includes switch groups 21b and 22b. The switch group 21b has an n-number of switches SW2n+1 to SW3n corresponding to an an-number of sensors 50-2n+1 to 50-3n and a bias voltage switch SWDb+ corresponding to the reference voltage. One ends of the switches SW2n+1 to SW3 are coupled respectively to IC terminals SIN2n+1 to SIN3n, and the other ends thereof are coupled to the one input terminal (positive input terminal) of the differential amplifier 11b. One end of the switch SWDb+ is coupled to the output of the reference voltage source 14 through the dummy impedance circuit 30b, and the other end thereof is coupled to the positive input terminal of the differential amplifier 11b. The switch group 21b selectively outputs a signal input from the sensors 50-2n+1 to 50-3n through the IC terminals SIN2n+1 to SIN3n and a reference voltage input from the reference voltage source 14 through the dummy impedance circuit 30b.

The switch group 22b has an n-number of switches SW3n+1 to SW4n corresponding to an n-number of sensors 50-3n+1 to 50-4n and a bias voltage switch SWDb− corresponding to the reference voltage. One ends of the switches SW3n+1 to SW4n are coupled respectively to IC terminals SIN3n+1 to SIN4n, while the other ends thereof are coupled to the other input terminal (negative input terminal) of the differential amplifier 11b. One end of the switch SWDb− is coupled to the output of the reference voltage source 14 through the dummy impedance circuit 30b, while the other end thereof is coupled to the negative input terminal of the differential amplifier 11b. The switch group 22b selectively outputs a signal input from the n-number of sensors 50-3n+1 to 50-4n through the IC terminals SIN3n+1 to SIN4n and a reference voltage input from the reference voltage source 14 through the dummy impedance circuit 30b.

The driving circuit 15 drives the switches of the switch groups 21b and 22b, in addition to the switches in the switch groups 21a and 22a. The control circuit 16 controls also selection (ON) and non-selection (OFF) of the switches in the switch groups 21b and 22b, through the driving circuit 15. The control circuit 16 controls any one of the switches SW2n+1 to SW4n to be ON, and controls the rest to be OFF. The control circuit 16 controls one of the switches SWDb+ and SWDb− to be ON, and controls the other one thereof to be OFF.

The differential amplifier 11b amplifies a differential voltage between a signal (voltage) output from the output terminal of the switch group 21b and a signal output from the output terminal of the switch group 22b, and outputs it. When any of the signals input from the IC terminals SIN2n+1 to SIN3n in the switch group 21b is selected, the differential amplifier 11b amplifies a differential voltage between the selected signal and a reference voltage input through the dummy impedance circuit 30b and the switch SWDb−. When any of the signals input from the IC terminals SIN3n+1 to SIN4n in the switch group 22b is selected, the differential amplifier 11b amplifies a differential voltage between the selected signal and a reference voltage input through the dummy impedance circuit 30b and the switch SWDb+.

In this embodiment, the control circuit 16 selects any one of the sensors 50-1 to 50-2n and any one of the sensors 50-2n+1 to 50-4n. When the control circuit 16 controls any of the switches SW1 to SWn included in the switch group 21a to be ON, it controls a switch SWDa− in the switch group 22a to be ON. When the control circuit 16 controls any of the switches SWn+1 to SW2n included in the switch group 22a, it controls a switch SWDa+ in the switch group 21a to be ON. When the control circuit 16 controls any of the switches SW2n+1 to SW3n included in the switch group 21b to be ON, it controls a switch SWDb− included in the switch group 22b. When the control circuit 16 controls any of the switches SW3n+1 to SW4n included in the switch group 22b to be ON, it controls a switch SWDb+ included in the switch group 21b to be ON.

[Summary]

In this embodiment, the semiconductor device 10a has the two differential amplifiers. The differential amplifiers 11a is used for detecting a reception signal of the sensors 50-1 to 50-2n, while the differential amplifier 11b is used for detecting a reception signal of the sensors 50-2n+1 to 50-4n. In the first embodiment, when the total number of sensors is sixty, an operation for selecting a sensor and receiving a signal therefrom is repeated sixty times. In this embodiment, on the other hand, it is possible to process parallelly for any of signals of the sensors 50-1 to 50-2n and any of signals of the sensors 50-2n+1 to 50-4n. Thus, the operation for selecting the sensor and receiving the signal is repeated simply thirty times. In this embodiment, it is possible to attain an effect of improving the detection speed, in addition to an effect of improving the PSRR characteristics attained in the first embodiment.

Third Embodiment

Figure 4:
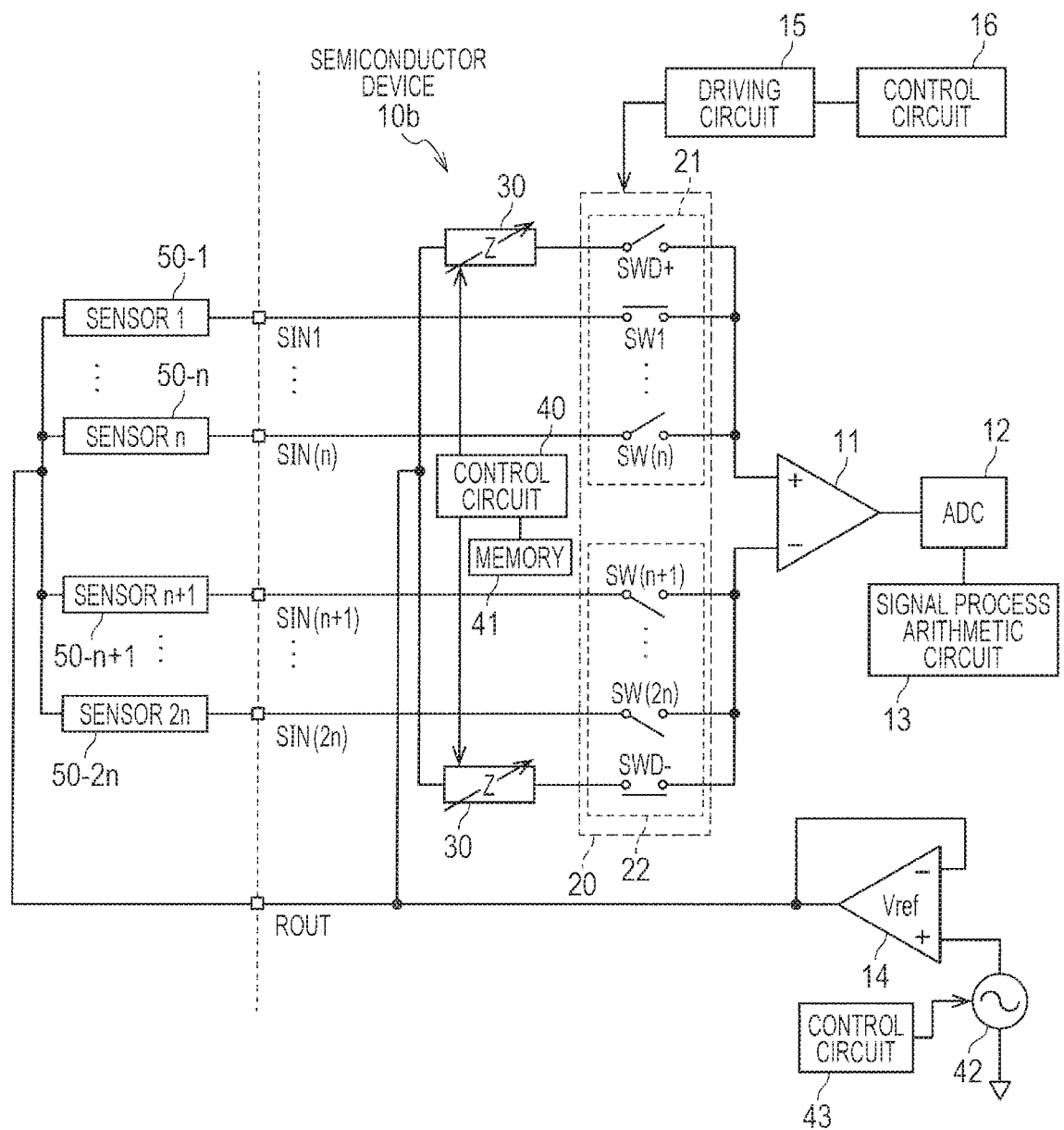
FIG. 4 is a block diagram illustrating a semiconductor device according to a fourth embodiment.

Now, descriptions will be made to a third embodiment. FIG. 4 illustrates a semiconductor device according to a fourth embodiment. The semiconductor device 10b according to this embodiment has a control circuit (impedance control circuit) 40, a memory 41, a voltage signal source 42, and a control circuit 43, in addition to the configuration of the semiconductor device 10 according to the first embodiment illustrated in FIG. 1. In this embodiment, the dummy impedance circuit 30 is configured in a manner that the impedance value is set variable. Any other points are the same as those of the first embodiment.

The dummy impedance circuit 30 is configured with, for example, a variable resistor. The dummy impedance circuit 30 is configured with, for example, a FET (transistor), such as an nMOSFET (metal-oxide-semiconductor field-effect transistor), and controls a voltage applied to the gate of the FET which is output from the control circuit 40, thereby enabling to realize a desired resistance value. The FET may be a pMOSFET. For example, the voltage to be applied to the gate of the FET which is output from the control circuit 40 is controlled using a variable voltage regulator without being effected by a source voltage variation. Alternatively, the voltage to be applied to the gate may be controlled, using a DAC (Digital to Analog Converter). When the voltage to be applied to the gate is controlled using some unit like a DAC which is effected by a source voltage variation, it is preferred to provide a filter for decreasing the frequency of a reception signal for the output of the DAC. Because the filter may simply be provided in the control circuit 40, it results in a small area impact.

The dummy impedance circuit 30 may be configured with a variable capacitor. For example, the capacitance value of the gate capacitance of the FET has voltage dependency. Changing the bias voltage value attains a desired capacitance value. The bias voltage is supplied from, for example, a regulator without being effected by a source voltage variation. Alternatively, the bias voltage may be supplied from the DAC. When the bias voltage is controlled using some unit like a DAC which is effected by a source voltage variation, like described above, it is preferred to provide a filter for decreasing the frequency of a reception signal for the output of the DAC.

The control circuit 40 controls the impedance value of the dummy impedance circuit 30. The control circuit 40 controls, for example, an output voltage of the above-described regulator or a digital value input to the DAC, thereby controlling the impedance value of the dummy impedance circuit 30. The control circuit 40 performs calibration for making the impedance value of the dummy impedance circuit 30 equal to a desired impedance value. When a sensor is selected from a plurality of sensors, the control circuit 40 performs calibration for the impedance value of the dummy impedance circuit 30. The control circuit 40 stores control information (control value) for realizing the desired impedance value obtained by the calibration, in the memory 41. At the detection of a target object to be measured, the control circuit 40 controls the impedance value of the dummy impedance circuit 30, based on the control information read from the memory 41.

In this embodiment, the positive input terminal of the reference voltage source 14 is coupled to the voltage signal source 42, instead of the reference potential. The voltage signal source 42 is configured to be able to output a signal of a predetermined frequency. The control circuit 43 controls the voltage signal source 42. When the above-described calibration is performed, the control circuit 43 outputs a signal of a predetermined frequency to the voltage signal source 42. In this case, the reference voltage source 14 outputs a frequency signal with a predetermined amplitude. At the detection of a target object to be measured, the control circuit 43 controls the voltage signal source 42 to output a fixed voltage, for example, a half voltage of the source voltage VDD. In this case, the reference voltage source 14 generates a reference voltage, similarly to the case of the first embodiment.

In this case, the reference voltage source 14 is coupled to the sensors 50-1 to 50-2n and the dummy impedance circuit 30, and coupled also to the positive input terminal and the negative input terminal of the differential amplifier 11 through a selected switch. For example, in a circuit configuration in which the voltage signal source 42 is effected by a source voltage variation, a signal with a predetermined amplitude, as output by the reference voltage source 14, is effected by the source voltage variation. Even in this case, the positive input terminal and the negative input terminal of the differential amplifier 11 are equally effected by the source voltage variation, thereby canceling the variation in the output of the differential amplifier. Thus, the voltage signal source 42 and the reference voltage source 14 may have a circuit configuration which is effected by the source voltage variation.

[Calibration]

Figure 5:
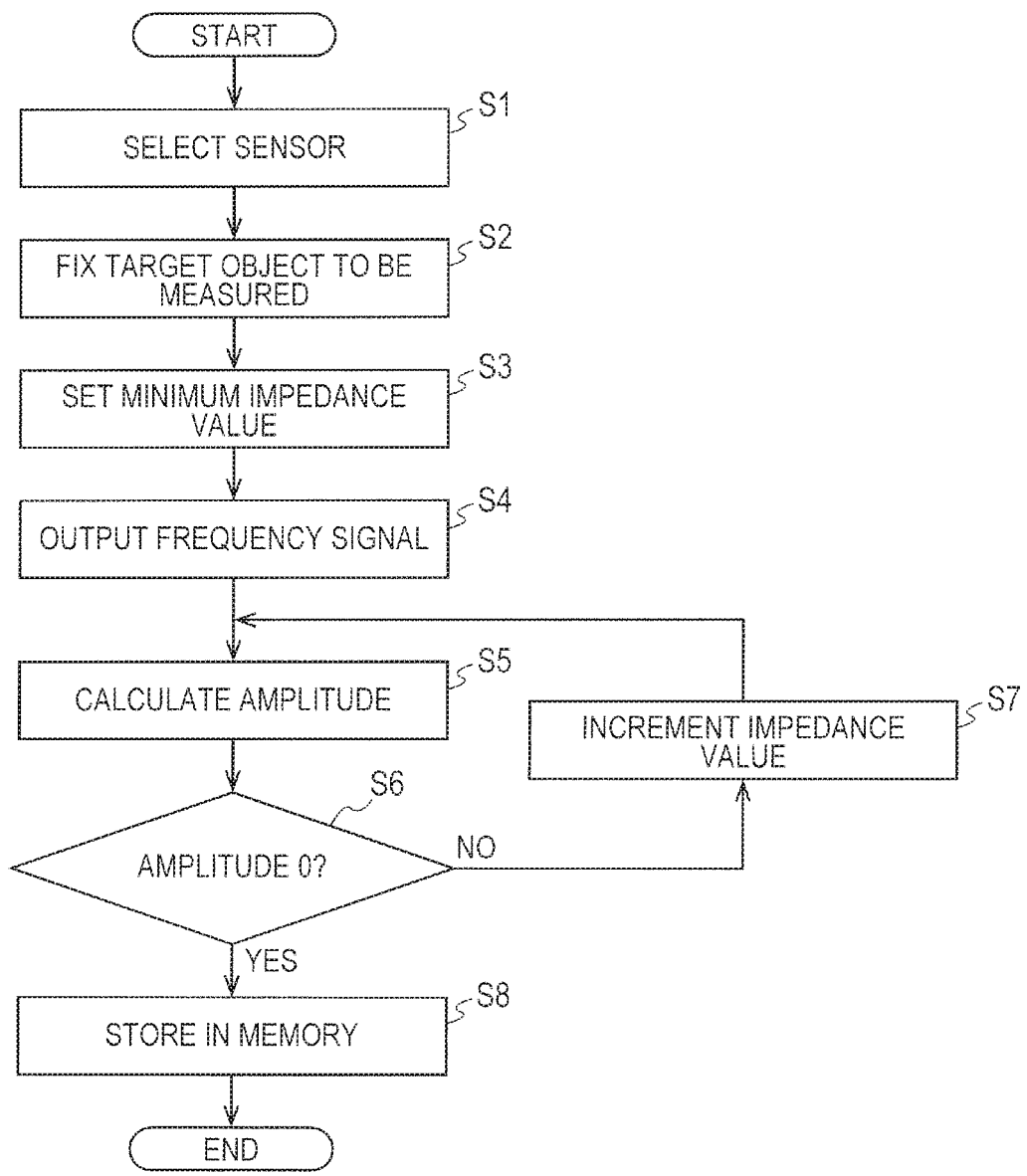
FIG. 5 is a flowchart illustrating a calibration operation procedure.

FIG. 5 illustrates a calibration operation procedure. The control circuit 16 controls the switches of the switch groups 21 and 22, and selects a target sensor for calibration, through the driving circuit 15 (Step S1). The control circuit 16 controls only, for example, the switch SW1 in the switch group 21 to be ON, and controls only the switch SWD− in the switch group 22 to be ON, thereby selecting the sensor 50-1. For example, the user fixes a target object to be measured, in a position away from the selected sensor by a desired distance (Step S2). The target object to be measured is fixed in a position sufficiently away from the sensor by, for example, 10 cm. The control circuit 40 sets impedance value of the dummy impedance circuit 30 to the minimum (Step S3).

The control circuit 43 controls the voltage signal source 42 to output a signal with the same frequency as that of the reception signal. In this case, the reference voltage source 14 outputs a signal with a predetermined frequency equal to that of a frequency of the reception signal (Step S4). The signal with the predetermined frequency, as output by the reference voltage source 14, is input to the sensor 50-1 through the IC terminal ROUT. The signal with the predetermined frequency is input to the dummy impedance circuit 30. The positive input terminal of the differential amplifier 11 is coupled to the sensor 50-1 through the switch SW1, while the negative input terminal thereof is coupled to the dummy impedance circuit 30 through the switch SWD−. The differential amplifier 11 amplifies a potential difference between the positive input terminal and the negative input terminal, and outputs it. The ADC 12 samples the output of the differential amplifier 11.

The signal process arithmetic circuit 13 calculates the amplitude of sampling data output by the ADC 12 (Step S5). To calculate the amplitude using the output of the ADC 12, the ADC 12 needs to perform the sampling for a period equal to or longer than a half cycle of the reception frequency, based on a sampling theorem. The amplitude is 0 (constant value), when the impedance value of the sensor 50-1 which includes the mutual interaction is equal to the impedance value of the dummy impedance circuit 30.

The signal process arithmetic circuit 13 judges whether the amplitude calculated in Step S5 is 0 (Step S6). When the signal process arithmetic circuit 13 judges that the amplitude is not 0, the control circuit 40 increments the impedance value of the dummy impedance circuit 30 by a predetermined value (Step S7). After this, the process returns to Step S5, and the signal process arithmetic circuit calculates the amplitude. The processes from Step S5 to Step S7 are repeatedly performed until it is judged that the amplitude is 0 in Step S6.

When it is judged that the amplitude is 0 in Step S6, the control circuit 40 stores a control value for realizing the impedance value of the dummy impedance circuit 30 in the memory 41, in the case where the amplitude is 0 (Step S8). As described above example, the control circuit 40 sets the minimum impedance value of the dummy impedance circuit 30 in Step S3, and the impedance value is incremented gradually thereafter in Step S6. However, it is not limited to this example. For example, the control circuit 40 may set the maximum impedance value in Step S3, and may gradually decrement the impedance value in Step S6.

The above-described calibration may be performed for a part or entire of the 2n-number of sensors 50-1 to 50-2n coupled to the semiconductor device 10b. In this case, the control circuit 40 may store the sensor selected in Step S1 and a control value of the dummy impedance circuit 30 in the memory 41 in association with each other. When the sensor is used, the control circuit 43 controls the voltage signal source 42 to output a constant voltage, for example, VDD/2. Every time the selected sensor is switched, the control circuit 40 may read a control value corresponding to a sensor to be newly selected from the memory 41, and may control the dummy impedance circuit 30 based on the read control value.

In the above-described calibration, the impedance value of the dummy impedance circuit 30, which has an amplitude of 0, may be obtained under a plurality of conditions of different distances, while changing the distance between the target object to be measured and the selected sensor. For a particular sensor, the calibration may be performed in accordance with the above procedure, in a case where the target object to be measured and the sensor are in contact with each other (distance: 0 cm) or adjacent to each other (for example, distance: 1 cm). Alternatively, when the distance between the target object to be measured and the sensor can be assumed as infinite, that is, when there is no target object to be measured, the same procedure as described above can be performed. In the case, the control circuit 40 may store the distance and the control value of the dummy impedance circuit 30 in the memory 41 in association with each other.

At the time of detection, the distance between the target object to the measured and the sensor has a correlation with the amount of the mutual interaction. For example, when the mutual interaction is electromagnetic induction, mutual induction M is large as the distance is short. Thus, the distance between the target object to be measured and the sensor is indicated in the amplitude of the reception signal. The control circuit 40 may acquire the amplitude value calculated at the detection, of the sampling data obtained by the ADC 12, from the signal process arithmetic circuit 13. Then, the circuit 40 may read a control value corresponding to the distance estimated based on the amplitude value from the memory 41, and may control the dummy impedance circuit 30 based on the read control value.

In this case, one of the switches SWD+ and SWD− is controlled to be ON, while the other one thereof is controlled to be OFF. For example, when the switch SWD− is controlled to be ON, the switch SWD+ is controlled to be OFF. At this time, let it be assumed that the control circuit 40 controls both of the dummy impedance circuits coupled to the switches SWD+ and SWD−, based on the read control value read from the memory 41. In this case, because the switch SWD+ is controlled to be OFF, no effect is produced on the reception signal, regardless of the impedance value of the dummy impedance circuits 30. Thus, the control circuit 40 does not need to be configured to control individually the two dummy impedance circuits 30.

The sensors 50-1 to 50-2n may include different types of sensors, or may include sensors of different reception frequencies. In this case, the frequency of a frequency signal output from the reference voltage source 14 in Step S4 may be changed in accordance with the sensor selected in Step S1. By setting the frequency of the signal output by the voltage signal source 42 coupled to the reference voltage source 14 at the reception frequency of each sensor, the impedance value of the dummy impedance circuit 30 can be matched with the impedance of the sensor at the detection, even when different types of sensors are used.

[Variable Range of Impedance Value]

Figure 6:
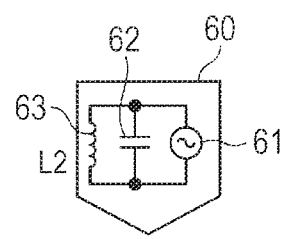
FIG. 6 is a schematic diagram illustrating an example of a sensor and a position indication device.
Figure 6:
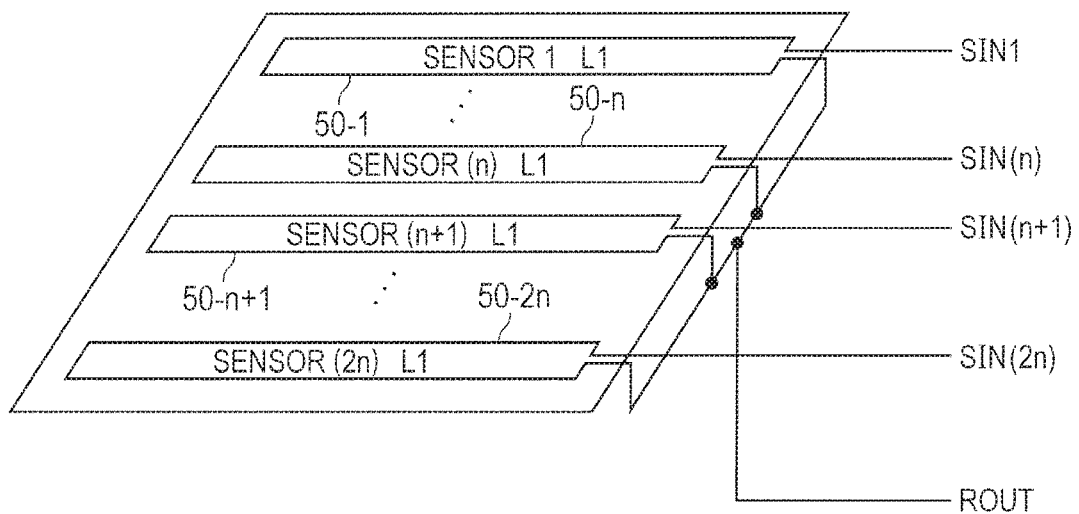

Descriptions will now be made to a variable range of the impedance value of the dummy impedance circuit 30. Descriptions will be made to a case in which the semiconductor device 10b according to this embodiment is used for the same position detection device as Japanese Unexamined Patent Application Publication No. 2017-126116. FIG. 6 schematically illustrates an example of the sensor and the position indication device. The sensors 50-1 to 50-2n are configured as loop coils. The loop coil group including the sensors 50-1 to 50-2n is arranged in a monitor of a PC (Personal Computer) having the paper size of, for example, A4. One ends of the sensors 50-1 to 50-2n are coupled respectively to the IC terminals SIN1 to SIN2n, while the other ends thereof are coupled to the IC terminals ROUT. The self-inductance of each loop coil is L1 (positive real number).

A position indication device 60 has a frequency signal generation unit 61, a capacitor 62, and a coil 63. Self-inductance of the coil 63 is L2 (positive real number). The position indicating device 60 is configured as a pen-type device, and has a size of a general writing tool. In this case, the relationship between the self-inductance L1 of the sensors 50-1 to 50-2n and the self-inductance L2 of the coil 63 in the position indicating device 60 is L1>L2, based on the relationship between the size of the position indicating device and the screen size.

In general, the mutual inductance M is expressed by $M=k(L1*L2)^{1/2}$, where k is a coupling coefficient having a value greater than $-1$ and smaller than 1. Thus, the condition of the mutual inductance M is $-(L1*L2)^{1/2}<M<(L1*L2)^{1/2}$. Because L1>L2, $(L1*L2)^{1/2}<L1$ is satisfied.

In this case, the dummy impedance circuit 30 is preferred to simply change the impedance value in a range of the impedance corresponding to $L1\pm(L1*L2)^{1/2}$, in the frequency of the reception signal. When this dummy impedance circuit is used, the impedance value can be adjusted to an impedance value for realizing the amplitude 0 at the time of calibration, for any distances. When the winding direction (polarity) of the loop coil and the coil 63 of the position indicating device 60 is set in advance, it is possible to limit the variable range to a positive range (impedance range corresponding from 0 to $(L1*L2)^{1/2}$) or a negative range (impedance range corresponding from $-(L1*L2)^{1/2}$ to 0). The dummy impedance circuit 30 is not necessarily configured with an inductor.

Figure 7:
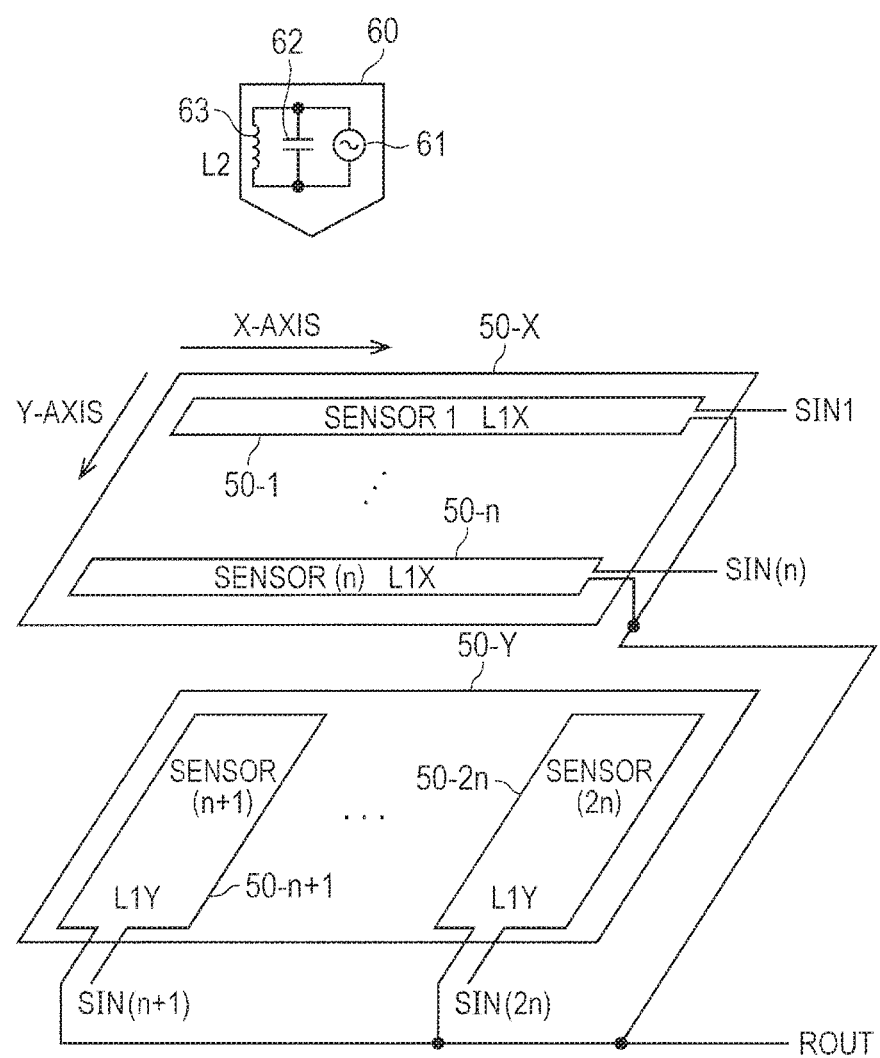
FIG. 7 is a schematic diagram illustrating another example of a sensor and a position indication device.

FIG. 7 schematically illustrates another example of a sensor and a position indication device. The sensors 50-1 to 50-2n are configured as loop coils. In this example, the sensors 50-1 to 50-n are configured in a loop coil group 50-X on the X axis, while the sensors 50-n+1 to 50-2n are configured in a loop coil group 50-Y on the Y axis. FIG. 7 illustrates the loop coil group 50-X and the loop coil group 50-Y in a manner that they are separated from each other, and they are in fact attached to each other and arranged in an overlapped state. Note, however, that the loop coil group 50-X and the loop coil group 50-Y are electrically independent from each other.

One ends of the loop coils of the loop coil group 50-X are coupled respectively to the IC terminals SIN1 to SINn, while the other ends thereof are coupled to the IC terminal ROUT. One ends of the loop coils of the loop coil group 50-Y are coupled respectively to the IC terminals SINn+1 to SIN2n, while the other ends thereof are coupled to the IC terminal ROUT. The self-inductance of each loop coil of the loop coil group 50-X is L1X (positive real number), while the self-inductance of each loop coil of the loop coil group 50-Y is L1Y (positive real number). PC monitors generally have different lengths in a vertical side (Y axis) and a horizontal side (X axis). When the size of the screen in the horizontal direction is greater than the size of the vertical side, the relationship between the self-inductance L1X of the loop coil group 50-X and the self-inductance L1Y of the loop coil group 50-Y is L1Y<L1X. Like this example, the sensors 50-1 to 50-2n may include two types of sensors whose self-inductance differs from each other.

When the loop coils (sensors 50-n+1 to 50-2n) of the loop coil group 50-Y are selected in the semiconductor device 10b, the switch SWD+ is controlled to be ON. The variable range of the impedance value requested for the dummy impedance circuit 30 coupled to the switch SWD+ is $L1Y\pm(L1Y*L2)^{1/2}$, while the variable range of the impedance value requested by the dummy impedance circuit 30 coupled to the switch SWD- is $L1X\pm(L1X*L2)^{1/2}$. That is, it is required that the variable width of the dummy impedance circuit 30 coupled to the switch SWD- is greater than the variable width of the dummy impedance circuit 30 coupled to the switch SWD+. In this case, the variable width of both of the dummy impedance circuits 30 may be $\pm(L1X*L2)^{1/2}$. The variable range may be $L1Y\pm(L1X+L2)^{1/2}$ for the dummy impedance circuit 30 coupled to the switch SWD+, and may be $L1X\pm(L1X+L2)^{1/2}$ for the dummy impedance 30 coupled to the switch SWD-.

When the self-inductance L2 of the coil 63 included in the position indication device 60 is unknown, the relationship of the self-inductance is L2<L1Y<L1X. Thus, the variable range of the dummy impedance circuit 30 coupled to the switch SWD+ may be $L1Y\pm L1Y$. In addition, the variable range of the dummy impedance circuit 30 coupled to the switch SWD- may be $L1X\pm(L1X*L1Y)^{1/2}$. In this case, the value of the self-inductance L2 can correspond to various different position indication devices 60.

In the described above example, the loop coils of the loop coil group 50-X are coupled to the IC terminals SIN1 to SINn, and the loop coils of the loop coil group 50-Y are coupled to the IC terminals SINn+1 to SIN2n. However, it is not limited that the entire loop coils of the loop coil group 50-X are coupled to the IC terminals SIN1 to SINn, and the entire loop coils of the loop coil group 50-Y are coupled to the IC terminals SINn+1 to SIN2n. It may be unknown that the coils of which loop coil group are coupled to the IC terminals SIN1 to SIN2n. In this case, the variable range of the dummy impedance circuits 30 coupled to the switches SWD+ and SWD- may preferably be a range from the minimum value to the maximum value of the variable range of the two dummy impedance circuits 30 coupled to the respective switches SWD+ and SWD-. Specifically, based on the relationship L2<L1Y<L1X, the variable range of both of the dummy impedance circuits 30 coupled to the switches SWD+ and SWD- may preferably be a range from 0 to $L1X+(L1X*L1Y)^{1/2}$. When the self-inductance L2 of the coil 63 is known, and when it is unknown that the coils of which loop coil group are coupled to the IC terminals SIN1 to SIN2n, the variable range of both of the dummy impedance circuits 30 coupled to the switches SWD+ and SWD− may preferably be a range from $L1Y-(L1Y*L2)^{1/2}$ to $L1X+(L1X*L2)^{1/2}$.

[Summary]

In this embodiment, the impedance value of the dummy impedance circuit 30 is configured to be variable. The control circuit 40 performs calibration, and stores a control value for controlling the impedance value of the dummy impedance circuit 30 to coincide with the impedance value of the sensor with which a mutual interaction occurs, in the memory 41. At the time of detection, the control circuit 40 reads the control value stored at the time of calibration from the memory 41, to control the impedance value of the dummy impedance circuit 30 based on the control value. As a result, the impedance value of the dummy impedance circuit 30 can coincide accurately with the impedance value of the sensor at the detection, thereby improving the PSRR characteristics at the detection.

In this embodiment, the above-described calibration can be performed for the entire sensors 50-1 to 50-2n. In this case, even if a manufacturing irregularity is generated in the sensors 50-1 to 50-2n or the dummy impedance circuit 30, it is possible to optimize the impedance value of the dummy impedance circuit 30. The above-described calibration can be performed for the distance of a plurality of target objects to be measured. In this case, at the detection, it is possible to optimize the impedance for various distances, by controlling the impedance value of the dummy impedance circuit 30 in accordance with the distance between the sensor and the target object to be measured.

First Modification

Figure 8:
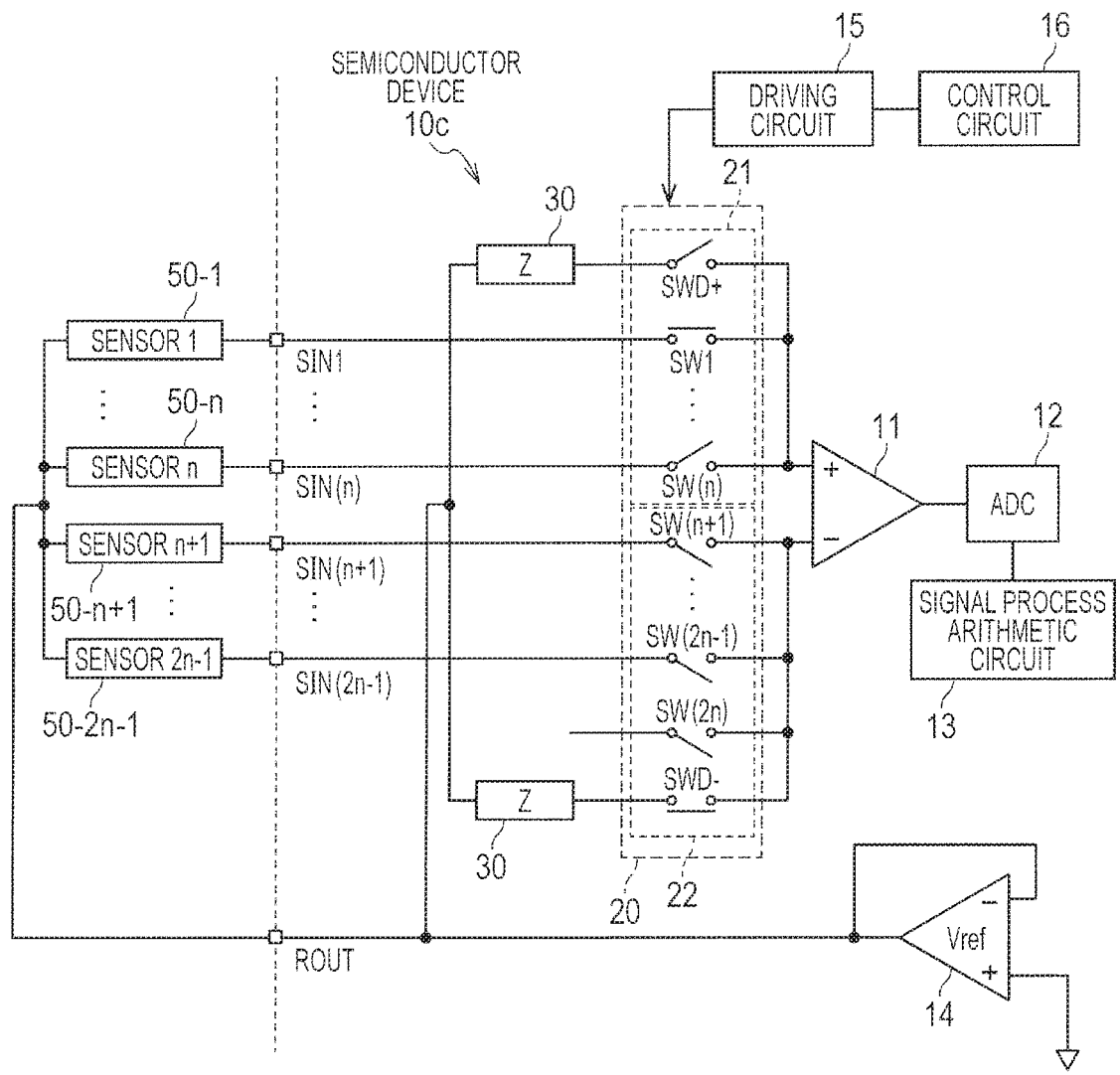
FIG. 8 is a block diagram illustrating a semiconductor device according to a first modification.

In the above-described embodiments, the descriptions have been made to the case wherein an even number of sensors are coupled to the semiconductor device 10. However, the semiconductor device 10 may have a configuration with an odd number of IC terminals coupled to the sensors and an odd number of sensors coupled thereto. FIG. 8 illustrates a semiconductor device according to a first modification. The configuration of a semiconductor device 10c according to this modification is the same as the configuration of the semiconductor device 10 illustrated in FIG. 1, except that the IC terminal SIN2n is excluded therefrom. In this embodiment, the switch SW2n included in the switch group 22 is not coupled to the IC terminal, and is open. Any other points may be the same as any of the above embodiment.

One end of the switch SW2n is open, while the other end thereof is coupled to the negative input terminal of the differential amplifier 11. The one end of the switch SW2n may be coupled to wiring to which a constant voltage is supplied from the power source VDD or ground GND. The control circuit 16 controls any of the 2n−1-number of switches SW1 to SW2n−1 to be ON, and controls the rest to be OFF. The control circuit 16 controls the switch SW2n to be always OFF. When any of the switches SW1 to SWn in the switch group 21 is selected, the control circuit 16 selects the switch SWD− in the switch group 22. When any of the switches SWn+1 to SW2n−1 in the switch group 22, the control circuit 16 selects the switch SWD+ in the switch group 21. As a result, like the first embodiment, it is possible to detect the reception signal of the selected sensor.

FIG. 8 illustrates an example in which the switch group 22 includes a switch which is not coupled to the sensor coupling IC terminal. The position of the switch not coupled to the IC terminal is arbitrary. For example, the switch group 21 may include a switch not coupled to the IC terminal. More particularly, for example, when the switch group 21 has an n-number of switches SW1 to SWn, and also the switch group 22 has an n-number of switches SWn+1 to SW2n, one end of the switch SW1 may be open without being coupled to the IC terminal. Even in this case, unless the switch SW1 is controlled to be ON, the same operation as described above can be realized.

The descriptions have been made to the example wherein the semiconductor device 10c does not have the IC terminal SIN2n. However, in this modification, the semiconductor device 10c may have the IC terminal SIN2n, like the semiconductor device 10 according to the first embodiment. In this case, no sensor is coupled to any one of the 2n-number of switches SW1 to SW2n. It is not limited that the number of IC terminals to which no sensor is coupled is one. No sensor may be coupled to an arbitrary number of IC terminals. The control circuit 16 controls the switch coupled to the IC terminal to which no sensor is coupled, to be OFF. For example, when no sensor is coupled to the IC terminal SIN2n, the control circuit 16 always controls the switch SW2n to be OFF. Also in this case, the same operation as described above can be realized.

Second Modification

Figure 9:
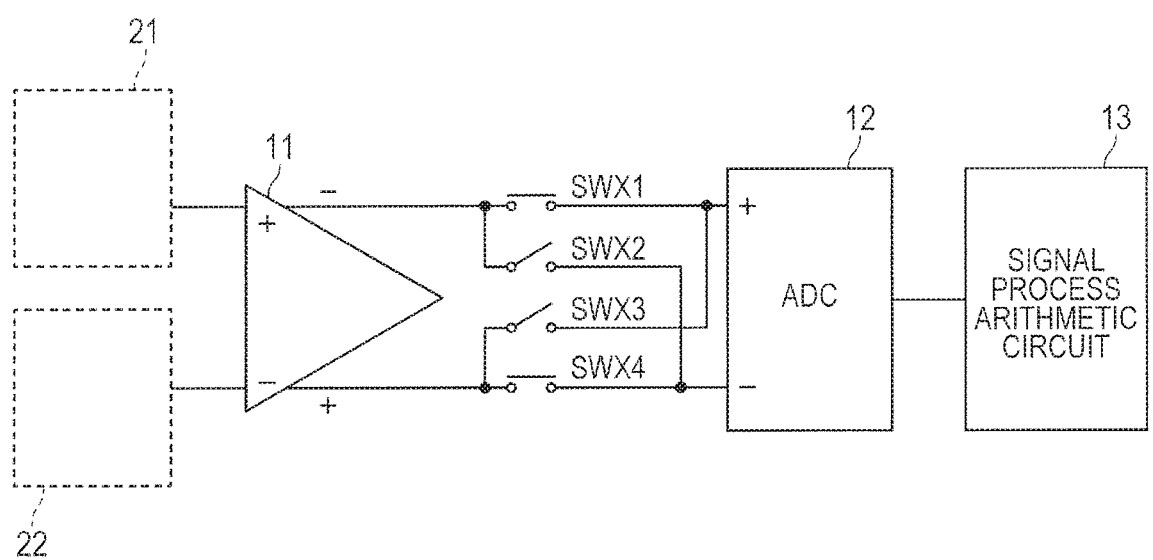
FIG. 9 is a block diagram illustrating a semiconductor device according to a second modification.

In the above-described embodiments, the descriptions have been made to the example wherein the signal process arithmetic circuit 13 performs a process for reversing the polarity. However, it is not limited to this. FIG. 9 illustrates a part of a semiconductor device according to a second embodiment. In this modification, the differential amplifier 11 is configured as a differential amplifier which is of a double differential output type. In this modification, the ADC 12 is configured as an ADC of a double differential input type. Switches SWX1 to SWX4 are polarity reversing switches for reversing the polarity of a signal to be input to the ADC 12.

For example, when any of the switches SW1 to SWn in the switch group 21 is selected, the switches SWX2 and SWX3 are controlled to be ON, and the switches SWX1 and SWX4 are controlled to be OFF. In this case, positives are coupled with each other, and negatives are coupled with each other, in the output of the differential amplifier 11 and the input of the ADC 12. In the switch group 22, when any of the switches SWn+1 to SW2n in the switch group 22 is selected, the switches SWX1 and SWX4 are controlled to be ON, and the switches SWX2 and SWX3 are controlled to be OFF. In this case, the positive of the output of the differential amplifier 11 and the negative of the input of the ADC 12 are coupled with each other, and the negative of the output of the differential amplifier 11 and the positive of the input of the ADC 12 are coupled with each other. In this modification, the signal process arithmetic circuit 13 performs various arithmetic operations, including discrete Fourier transform, for sampling data, without performing the arithmetic operation for reversing the polarity.

In this modification, each two of the switches SWX1 to SWX4 are controlled to be selected, and the values of the impedance (parasitic capacitance) are made equal to each other, for both positive and negative inputs of the ADC 12. Though the switches SWX1 to SWX4 may possibly be effected by a source voltage variation, the effect of the source voltage variation is canceled, because the effect is produced on both of the positive and negative inputs of the ADC 12. Thus, it is possible to realize reversing of the signal polarity without deteriorating the PSRR characteristics. In this modification, the signal process arithmetic circuit 13 does not need to perform an arithmetic operation for reversing the polarity, thus enabling to reduce the arithmetic time. The reversing operation of the polarity as described in this modification is applicable to the second and third embodiments, or the first and third modifications.

Third Modification

Figure 10:
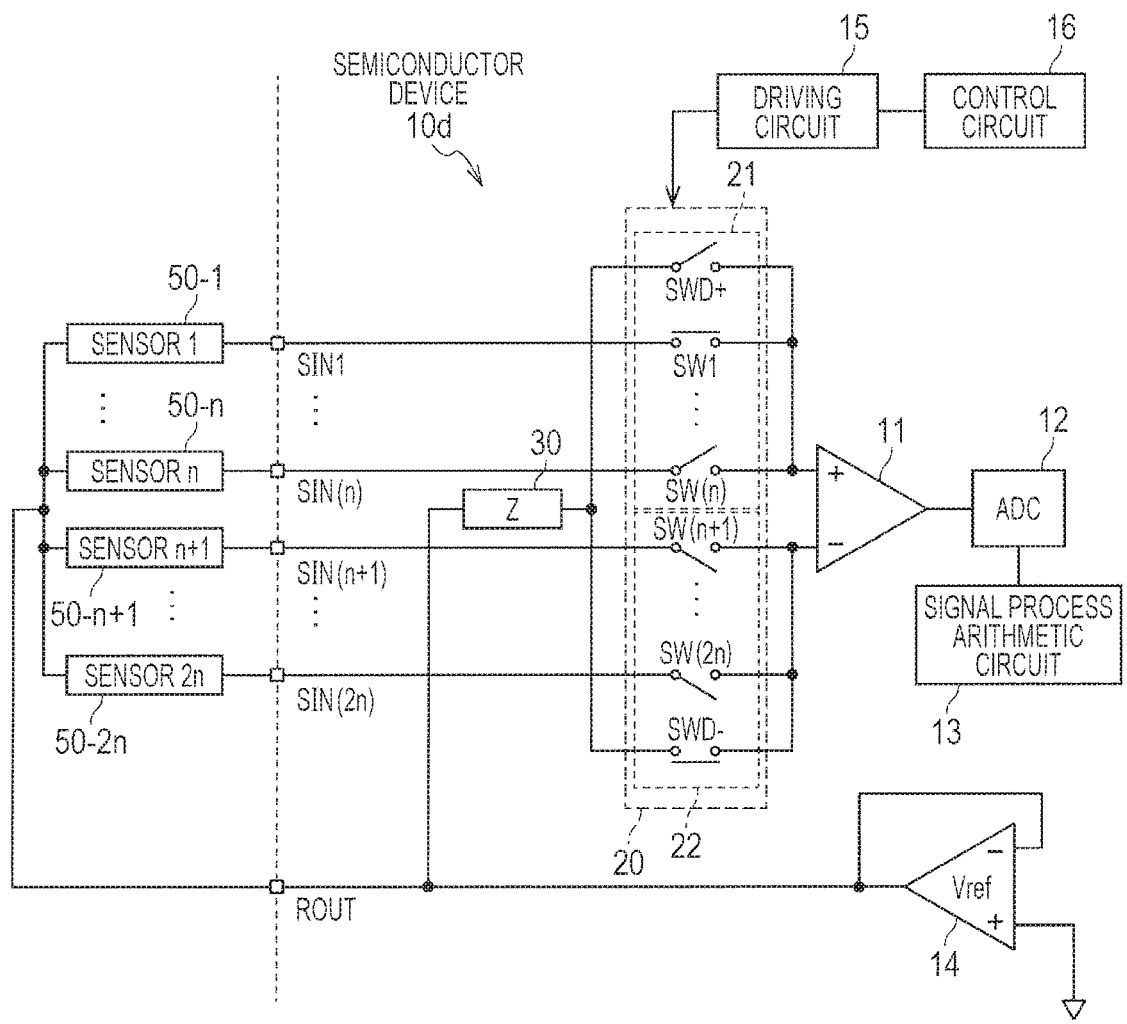
FIG. 10 is a block diagram illustrating a semiconductor device according to a third modification.

In the above-described embodiments, the dummy impedance circuits 30 are arranged individually for the switches SWD+ and the switch SWD−. However it is not limited to this example. FIG. 10 illustrates a semiconductor device according to a third modification. A semiconductor device 10d according to this modification differs from the semiconductor device 10 according to the first embodiment illustrated in FIG. 1 in that the dummy impedance circuit 30 is arranged commonly for the switches SWD+ and the switch SWD−. Any other points may be the same as those of the second or third embodiment, or any other points may be the same as those of the first or second modification. In this modification, an advantage is that one impedance circuit 30 can be excluded.

In the first embodiment, each the dummy impedance circuits 30 is coupled to one switch. In this embodiment, on the other hand, the dummy impedance circuit 30 common to both switches is coupled to the positive input terminal and the negative input terminal of the differential amplifier 11 through the switches SWD+ and SWD−. Thus, the best impedance value of the dummy impedance circuit 30 is one which has been obtained by subtracting the impedance value of one switch (SWD+ or SWD−) controlled to be OFF from the value explained in the first embodiment.

In general, because the switch needs to pass the reception signal, it has only a small parasitic component which does not produce an effect on a signal in the frequency of the reception signal. On the other hand, because the sensor has high sensitivity (for example, a resonance frequency) for the frequency of the reception signal, it has the impedance sufficiently higher than the parasitic component of the one switch controlled to be OFF. Thus, in principle, the impedance value can be optimized by subtracting the impedance value of one switch. However, in fact, it can be considered that any serious problem will not occur, even when the impedance value of the dummy impedance circuit 30 is set at the same value as that described in the first embodiment or its approximation value.

Another Modification

Figure 11:
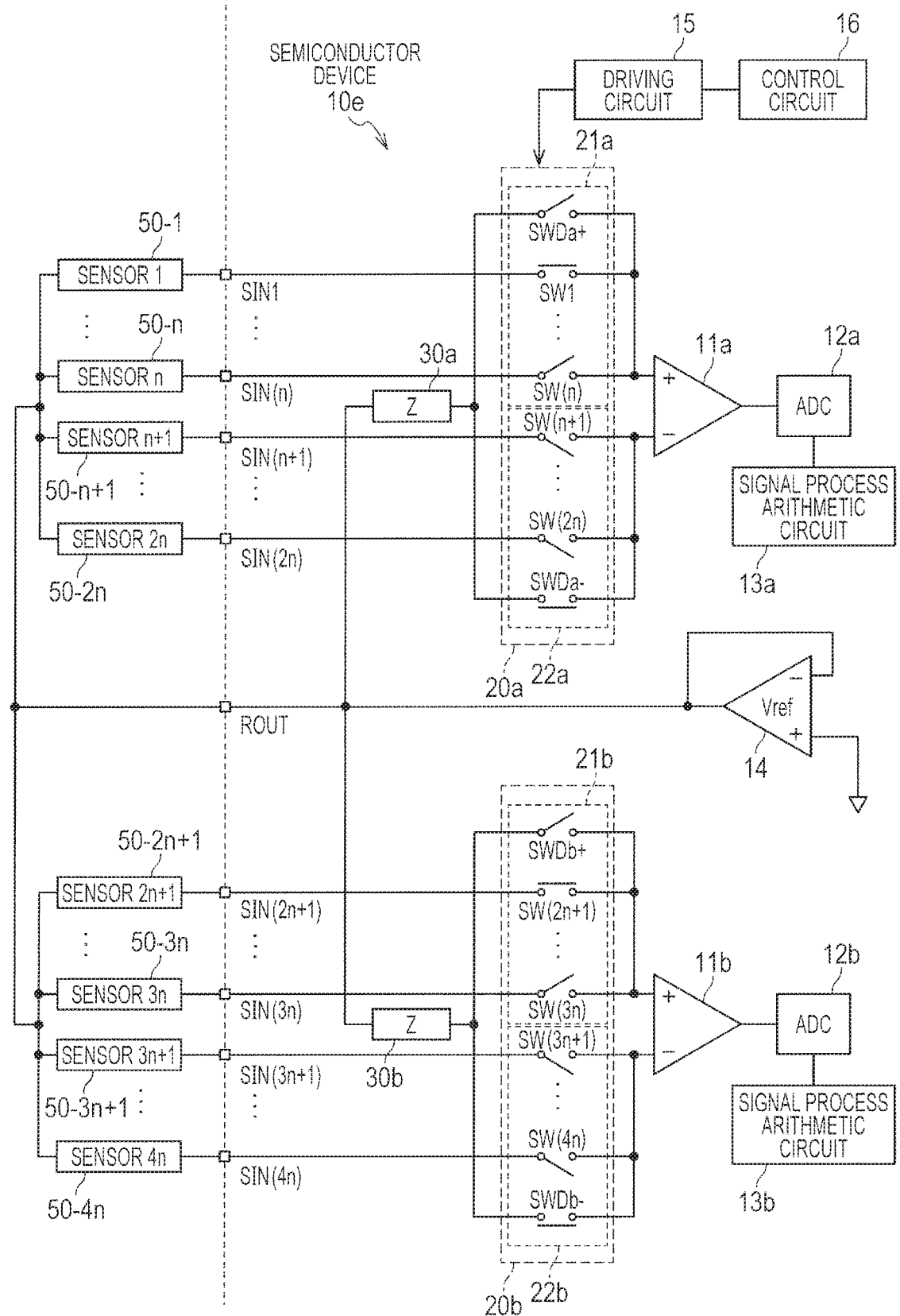
FIG. 11 is a block diagram illustrating a semiconductor device according to another first modification.

Any of the above-described embodiments and modifications can arbitrarily be combined together. FIG. 11 illustrates a semiconductor device according to another modification in combination of the second embodiment and the third modification. Like a semiconductor device 10a according to the second embodiment illustrated in FIG. 3, a semiconductor device 10e has the differential amplifiers 11a and 11b, the ADC 12a and 12b, the signal process arithmetic circuits 13a and 13b, the reference voltage source 14, the driving circuit 15, the control circuit 16, the switch circuits 20a and 20b, and the dummy impedance circuits 30a and 30b. The semiconductor device 10e is configured with two sets of the differential amplifier, the ADC, the signal process arithmetic circuit, the switch circuit, and the dummy impedance circuit. The semiconductor device 10e may be configured with three or more sets of the above.

In the modification illustrated in FIG. 11, like the third modification, the dummy impedance circuits 30a and 30b are arranged commonly to two bias voltage switches. The dummy impedance circuit 30a is coupled to the positive input terminal of the differential amplifier 11a through the switch SWDa+, and coupled to the negative input terminal of the differential amplifier 11a through the switch SWDa−. The dummy impedance circuit 30b is coupled to the positive input terminal of the differential amplifier 11b through the switch SWDb+, and coupled to the negative input terminal of the differential amplifier 11b through the switch SWDb−. The impedance values of the dummy impedance circuits 30a and 30b may be the same as those described in the third modification. When this semiconductor device 10e is used, it is possible to attain the effect attained in the second embodiment and the effect attained in the third modification.

Figure 12:
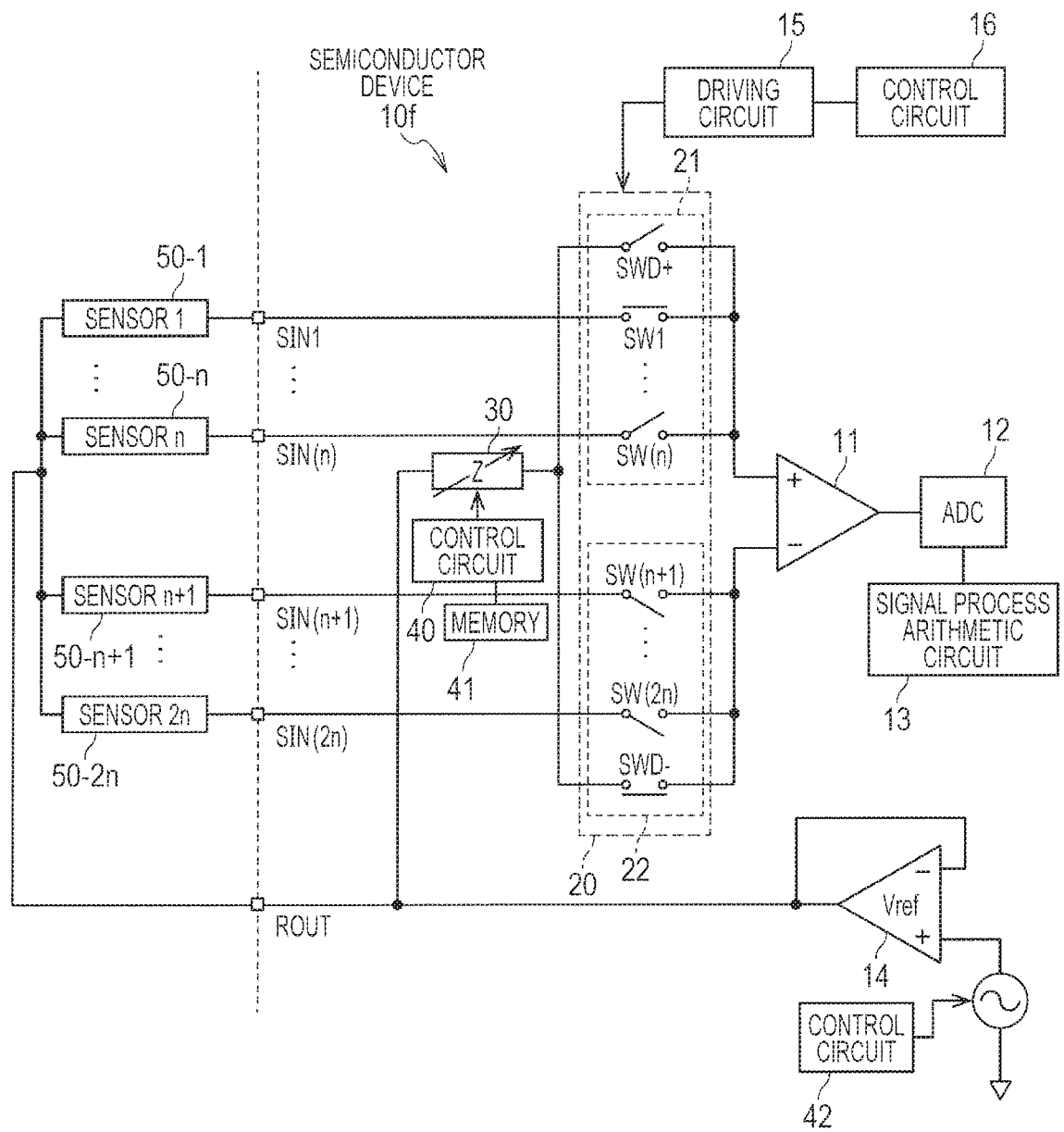
FIG. 12 is a block diagram illustrating a semiconductor device according to another second modification.

FIG. 12 illustrates a semiconductor device according to still another modification in combination of the third embodiment and the third modification. A semiconductor device 10f has the same configuration as that of the semiconductor device 10b according to the third embodiment illustrated in FIG. 4. In the semiconductor device 10f, like the third modification, the dummy impedance circuit 30 whose impedance value is variable is arranged commonly to two bias voltage switches SWD+ and SWD−. The calibration of the impedance value of the dummy impedance circuit 30 may be the same as that described in the third embodiment. When this semiconductor device 10e is used, it is possible to attain the effect of the third embodiment and the effect of the third modification. Like the semiconductor device 10a according to the second embodiment, the semiconductor device 10e may be configured with two sets of the differential amplifiers, the ADC, the signal process arithmetic circuit, the switch circuit, and the dummy impedance circuit.

Figure 13:
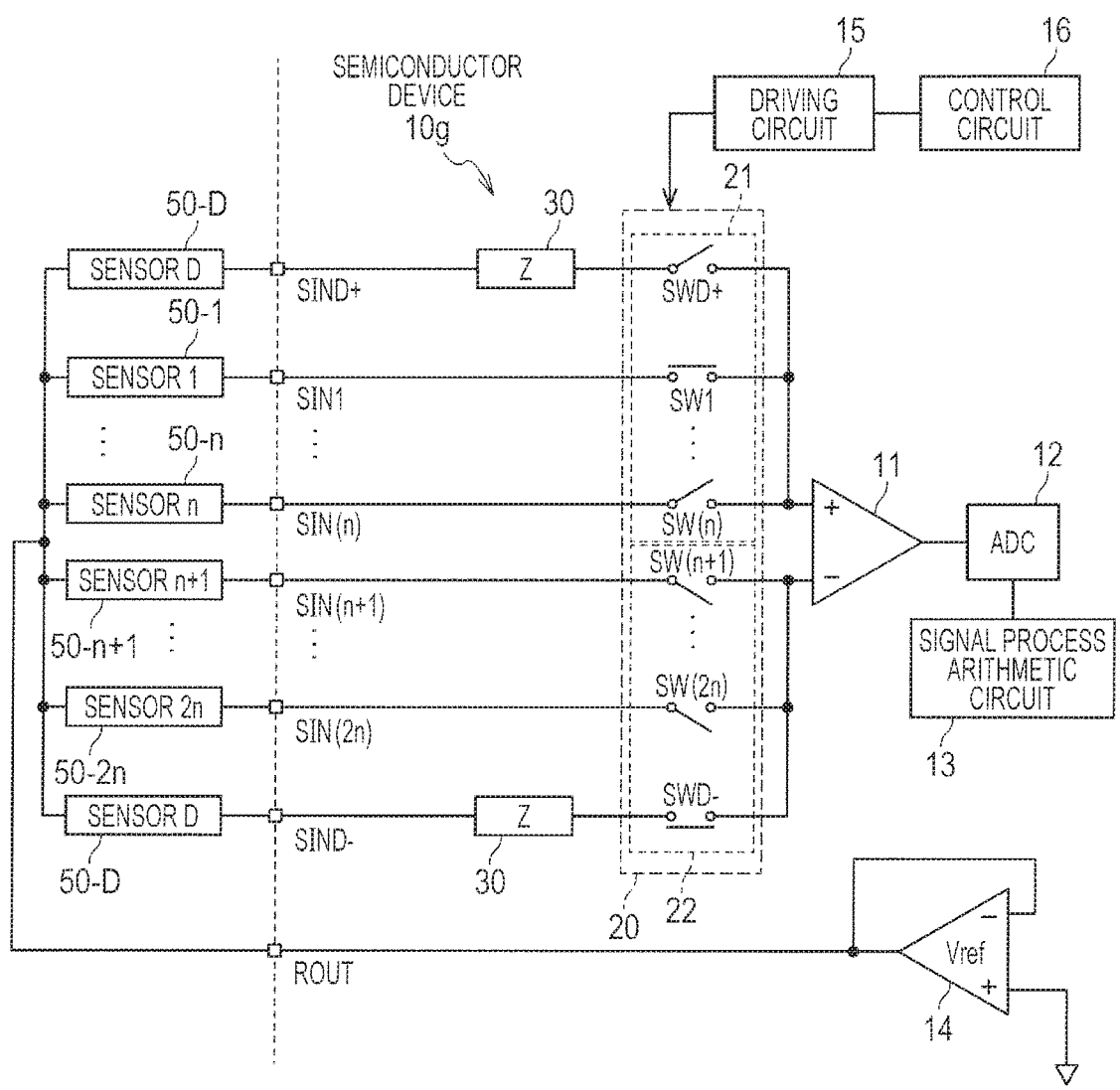
FIG. 13 is a block diagram illustrating a semiconductor device according to another third modification.

FIG. 13 illustrates a semiconductor according to still yet further modification. A semiconductor device 10g has IC terminals SIND+ and SIND− for coupling to the dummy sensors. To the IC terminals SIND+ and SIND−, one ends of dummy sensors 50-D are coupled. The dummy sensors 50-D have the same configuration as any other sensors. The dummy sensors 50-D are shielded, and do not react to a target object to be measured. The other ends of the dummy sensors 50-D are coupled to the reference voltage source 14 through the IC terminal ROUT. In the semiconductor 10g, the dummy impedance circuits 30 are coupled to the dummy sensors 50-D through the IC terminals SIND+ and SIND−. Any other points are the same as those of the semiconductor device 10 according to the first embodiment illustrated in FIG. 1.

In the first embodiment, the impedance value of the dummy impedance circuit 30 is set to a value which is obtained by adding an impedance value of a mutual interaction between the sensor and the target object to be measured, to the impedance value of the sensor. In the semiconductor device 10g, the impedance value of the dummy impedance circuit 30 is set to an impedance value corresponding to impedance generated by mutual induction, when the mutual interaction is, for example, electromagnetic induction. When the mutual interaction is, for example, electrostatic capacity, the impedance value of the dummy impedance circuit 30 is set to an impedance value corresponding to capacitance generated by mutual capacitance. In FIG. 13, the dummy impedance circuit 30 is arranged inside the semiconductor device 10g. However, the dummy impedance circuit 30 may be arranged outside the semiconductor device 10g.

The semiconductor device 10g has the IC terminals SIND+ and SIND− to which the dummy sensors 50-D are coupled. It is possible to couple an arbitrary dummy sensor 50-D to the IC terminals SIND+ and SIND−. This enables to correspond to the impedance of the sensor which has not been assumed in designing of the semiconductor device. The dummy sensors 50-D may have a configuration in which the impedance value is variable, like the third embodiment. In this case, by performing the calibration, it is possible accurately set the same impedance between both input terminals of the differential amplifier 11.

Accordingly, the present invention by the present inventors have specifically been described based on the preferred embodiments. The present invention is not limited to the preferred embodiments. Various changes may possibly be made without departing from the scope thereof.

For example, a part or the entire of the above embodiments may also be described as the following additional notes, but is not limited thereto.

[Additional Note 1]

A semiconductor device comprising:

a first group of sensor coupling terminals to which a first group of sensors are coupled;

a second group of sensor coupling terminals to which a second group of sensors are coupled;

a first switch group which selectively outputs a signal input from the first group of sensor coupling terminals and a reference voltage, from an output terminal;

a second switch group which selectively outputs a signal input from the second group of sensor coupling terminals and the reference voltage, from an output terminal;

a switch control circuit which controls the first switch group and the second switch group to select one sensor included in the first group of sensors or the second group of sensors;

a differential amplifier which has a first input terminal coupled to the output terminal of the first switch group and a second input terminal coupled to the output terminal of the second switch group, and amplifies and outputs a differential voltage between the first input terminal and the second input terminal; and a signal process circuit which performs a signal process for an output signal of the differential amplifier, wherein a number of switches included in the first switch group is equal to a number of switches included in the second switch group, and wherein, when to select a sensor included in the first group of sensors, the switch control circuit controls to select any of signals input from the first group of sensor coupling terminals in the first switch group and to select the reference voltage in the second switch group, and when to select a sensor included in the second group of sensors, the switch control circuit controls to select any of signals input from the second group of sensor coupling terminals in the second switch group and to select the reference voltage in the first switch group.

[Additional Note 2]

The semiconductor device according to additional note 1, wherein the first switch group includes at least one sensor coupling switch one end of which is coupled to the first group of sensor coupling terminals and other end thereof is coupled to the first input terminal, and a first bias voltage switch one end of which is coupled to the reference voltage and other end thereof is coupled to the first input terminal, wherein the second switch group includes at least one sensor coupling switch one end of which is coupled to the second group of sensor coupling terminals and other end thereof is coupled the second input terminal, and a second bias voltage switch one end of which is coupled to the reference voltage and other end thereof is coupled to the second input terminal.

[Additional Note 3]

The semiconductor device according to additional note 2, wherein the first group of sensor coupling terminals and the second group of sensor coupling terminals include dummy sensor coupling terminals coupled to dummy sensors and supplied with the reference voltage, wherein one ends of the first bias voltage switch and the second bias voltage switch are coupled to the reference voltage respectively through the dummy sensor coupling terminals and the dummy sensors.

[Additional Note 4]

The semiconductor device according to additional note 2, further comprising a dummy impedance circuit between the first bias voltage switch and the reference voltage and also between the second bias voltage switch and the reference voltage.

[Additional Note 5]

The semiconductor device according to additional note 4, wherein an impedance value of the dummy impedance circuit is set based on an impedance value of the first group of sensors and the second group of sensors and a variation of impedance which is generated by a mutual interaction between the sensors and a target object to be measured.

[Additional Note 6]

The semiconductor device according to additional note 4 or 5, wherein the dummy impedance circuit is arranged individually between the first bias voltage switch and the reference voltage and also between the second bias voltage switch and the reference voltage.

[Additional Note 7]

The semiconductor device according to additional note 4 or 5, wherein the dummy impedance circuit is arranged commonly between the first bias voltage switch and the reference voltage and between the second bias voltage switch and the reference voltage.

[Additional Note 8]

The semiconductor device according to additional note 3, further comprising a dummy impedance circuit between one ends of the first bias voltage switch and the second bias voltage switch, and the dummy sensor coupling terminal.

[Additional Note 9]

The semiconductor device according to additional note 8, wherein an impedance value of the dummy impedance circuit is set based on a variation of impedance which is generated by generating a mutual interaction between sensors used in the first group of sensors and the second group of sensors and a target object to be measured.

[Additional Note 10]

The semiconductor device according to any one of additional notes 4 to 9, wherein the dummy impedance circuit has a configuration in which an impedance value is variable.

[Additional Note 11]

The semiconductor device according to additional note 10, wherein a target object to be measured and the sensors include inductance, and a mutual interaction between the sensors and the target object to be measured is electromagnetic induction, and wherein, when $L1$ represents a positive real number representing self-inductance of the sensors and $L2$ represents a positive real number representing self-inductance of the target object to be measured, the dummy impedance circuit has a configuration in which an impedance value is variable in a range from an impedance value corresponding to $L1-(L1*L2)^{1/2}$ to an impedance value corresponding to $L1+(L1*L2)^{1/2}$.

[Additional Note 12]

The semiconductor device according to additional note 11, wherein the dummy impedance circuit has a configuration in which an impedance value is variable in a range from an impedance value corresponding to $L1-(L1*L2)^{1/2}$ to an impedance value corresponding to $L1$, or in a range from the impedance value corresponding to $L1$ to an impedance value corresponding to $L1+(L1*L2)^{1/2}$.

[Additional Note 13]

The semiconductor device according to additional note 10, wherein a target object to be measured and the sensors include inductance, a mutual interaction generated between the sensors and the target object to be measured is electromagnetic induction, and the first group of sensors and the second group of sensors include two sensors whose self-inductance differs from each other, and wherein, when $L1X$ and $L1Y$ represent a positive real number representing self-inductance of the two sensor, when $L2$ represents a positive real number representing self-inductance of the target object to be measured, and when $L1Y<L1X$ is satisfied, the dummy impedance circuit has a configuration in which an impedance value is variable in a range from impedance corresponding to $L1Y-(L1Y*L2)^{1/2}$ impedance corresponding to $L1X+(L1X*L2)^{1/2}$.

[Additional Note 14]

The semiconductor device according to additional note 10, wherein a target object to be and the sensors include inductance, a mutual interaction generated between the sensors and the target object to be measured is electromagnetic induction, and the first group of sensors and the second group of sensors include two sensors whose self-inductance differs from each other, and wherein, when $L1X$ and $L1Y$ represent positive real numbers representing self-inductance of the two sensors, when $L2$ represents a positive real number representing self-inductance of the target object to be measured, and when $L2<L1Y<L1X$ is satisfied, the dummy impedance circuit has a configuration in which an impedance value is variable in a range from 0 to impedance corresponding to $L1X+(L1X*L1Y)^{1/2}$.

[Additional Note 15]

The semiconductor device according to additional note 6, wherein the dummy impedance circuit has a configuration in which an impedance value is variable, a target object to be measured and the sensors include inductance, and a mutual interaction generated between the sensors and the target object to be measured is electromagnetic induction, wherein, when $L1X$ represents a positive real number representing self-inductance of sensors included in the first group of sensors, when $L1Y$ represents a positive real number representing self-inductance of sensors included in the second group of sensors, and when $L2$ represents a positive real number representing self-inductance of the target object to be measured, the dummy impedance circuit arranged between the first bias voltage switch and the reference voltage has a configuration in which an impedance value is variable in a range from impedance corresponding from $L1Y-(L1Y*L2)^{1/2}$ to $L1Y+(L1Y*L2)^{1/2}$, and the dummy impedance circuit arranged between the second bias voltage switch and the reference voltage has a configuration in which an impedance value is variable in a range from impedance corresponding from $L1X-(L1X*L2)^{1/2}$ to $L1X+(L1X*L2)^{1/2}$.

[Additional Note 16]

The semiconductor device according to additional note 6, wherein the dummy impedance circuit has a configuration in which an impedance value is variable, a target object to be measured and the sensors include inductance, and a mutual interaction generated between the sensors and the target object to be measured is electromagnetic induction, wherein, when $L1X$ represents a positive real number representing self-inductance of sensors included in the first group of sensors, when $L1Y$ represents a positive real number representing self-inductance of sensors included in the second group of sensors, when $L2$ represents a positive real number representing self-inductance of the target object to be measured, and when $L2<L1Y<L1X$ is satisfied, the dummy impedance circuit arranged between the first bias voltage switch and the reference voltage has a configuration in which an impedance value is variable in a range from 0 to impedance corresponding to $2*L1Y$, and the dummy impedance circuit arranged between the second bias voltage switch and the reference voltage has a configuration in which an impedance value is variable in a range of impedance corresponding from $L1X-(L1X*L1Y)^{1/2}$ to $L1X+(L1X*L1Y)^{1/2}$.

[Additional Note 17]

The semiconductor device according to any one of additional notes 10 to 16, further comprising an impedance control circuit which controls an impedance value of the dummy impedance circuit.

[Additional Note 18]

The semiconductor device according to additional note 17, wherein, in a state where the switch control circuit selects the sensor, the impedance control circuit calibrates an impedance value of the dummy impedance circuit in a manner that an amplitude of an output signal of the differential amplifier is a constant value, and stores control information of the dummy impedance circuit which has been obtained by the calibration in a memory.

[Additional Note 19]

The semiconductor device according to additional note 18, wherein the impedance control circuit stores, when the calibration is performed, information regarding the sensor selected by the switch control circuit and the control information in association with each other, in the memory.

[Additional Note 20]

The semiconductor device according to additional note 19, wherein the impedance control circuit performs the calibration for the sensors included in the first group of sensors and the sensors included in the second group of sensors.

[Additional Note 21]

The semiconductor device according to additional note 20, wherein the impedance control circuit reads the control information corresponding the sensor selected by the switch control circuit from the memory at a time of detecting a target object to be measured, and controls an impedance value of the dummy impedance circuit based on the read control information.

[Additional Note 22]

The semiconductor device according to any one of additional notes 18 to 21, wherein the calibration is performed in a state where a mutual interaction is generated between at least one of the first group of sensors and the second group of sensors and a target object to be measured.

[Additional Note 23]

The semiconductor device according to additional note 22, wherein the impedance control circuit performs the calibration under a plurality of conditions of different distances between the sensor and the target object to be measured, and stores the conditions and the control information in association with each other, in the memory.

[Additional Note 24]

The semiconductor device according to additional note 23, wherein the impedance control circuit reads control information corresponding to the distances between the sensor selected by the switch control circuit and the target object to be measured from the memory, and controls an impedance value of the dummy impedance circuit based on the read control information.

[Additional Note 25]

The semiconductor device according to additional note 24, wherein the impedance control circuit estimates the distance based on an amplitude of an output of the differential amplifier.

[Additional Note 26]

The semiconductor device according to any one of additional notes 1 to 25, a polarity reversing switch which reverses polarity of an output of the differential amplifier between the output of the differential amplifier and the signal process circuit.

[Additional Note 27]

The semiconductor device according to any one of additional notes 1 to 26, wherein at least one of the first switch group and the second switch group includes a non-coupling switch which is not coupled to the first group of sensor coupling terminals or the second group of sensor coupling terminals.

[Additional Note 28]

The semiconductor device according to additional note 27, wherein the switch control circuit does not select the non-coupling switch.

[Additional Note 29]

The semiconductor device according to any one of additional notes 1 to 28, further comprising two or more sets of the first group of sensor coupling terminals, the second group of sensor coupling terminals, the first switch group, the second switch group, the differential amplifier, and the signal process circuit.

[Additional Note 30]

The semiconductor device according to any one of additional notes 1 to 29, further comprising a reference voltage source for generating the reference voltage.

[Additional Note 31]

The semiconductor device according to additional note 30, further comprising a reference voltage output terminal for outputting the reference voltage, and wherein one ends of the first group of sensors and the second group of sensors are coupled to the reference voltage output terminal.

[Additional Note 32]

The semiconductor device according to any one of additional notes 1 to 31, wherein electric characteristics of the switches included in the first switch group are same as electric characteristics of the switches included in the second switch group.

What is claimed is:

1. A semiconductor device comprising:
   a first group of sensor coupling terminals to which a first group of sensors are coupled;
   a second group of sensor coupling terminals to which a second group of sensors are coupled;
   a first switch group which selectively outputs a signal input from the first group of sensor coupling terminals and a reference voltage, from an output terminal;
   a second switch group which selectively outputs a signal input from the second group of sensor coupling terminals and the reference voltage, from an output terminal; and
   a differential amplifier which has a first input terminal coupled to the output terminal of the first switch group and a second input terminal coupled to the output terminal of the second switch group, and amplifies and outputs a differential voltage between the first input terminal and the second input terminal,
   wherein a number of switches included in the first switch group is equal to a number of switches included in the second switch group.

2. The semiconductor device according to claim 1,
   wherein the first switch group includes a first bias voltage switch one end of which is coupled to the reference voltage and other end thereof is coupled to the first input terminal,
   wherein the second switch group includes a second bias voltage switch one end of which is coupled to the reference voltage and other end thereof is coupled to the second input terminal.

3. The semiconductor device according to claim 2, further comprising:
   a switch control circuit which controls the first switch group and the second switch group to select one sensor included in the first group of sensors or the second group of sensors,
   wherein, when to select a sensor included in the first group of sensors, the switch control circuit controls to select any of signals input from the first group of sensor coupling terminals in the first switch group and to select the reference voltage in the second switch group, and when to select a sensor included in the second group of sensors, the switch control circuit controls to select any of signals input from the second group of sensor coupling terminals in the second switch group and to select the reference voltage in the first switch group.

4. The semiconductor device according to claim 3, further comprising: a signal process circuit which performs a signal process for an output signal of the differential amplifier,
   wherein the first switch group includes at least one sensor coupling switch one end of which is coupled to the first group of sensor coupling terminals and other end thereof is coupled to the first input terminal,
   wherein the second switch group includes at least one sensor coupling switch one end of which is coupled to the second group of sensor coupling terminals and other end thereof is coupled the second input terminal.

5. The semiconductor device according to claim 1, further comprising
a polarity reversing switch which reverses polarity of an output of the differential amplifier between the output of the differential amplifier and the signal process circuit.

6. The semiconductor device according to claim 1,
wherein at least one of the first switch group and the second switch group includes a non-coupling switch which is not coupled to the first group of sensor coupling terminals or the second group of sensor coupling terminals.

7. The semiconductor device according to claim 1, further comprising
two or more sets of the first group of sensor coupling terminals, the second group of sensor coupling terminals, the first switch group, the second switch group, the differential amplifier, and the signal process circuit.

8. The semiconductor device according to claim 1, further comprising
a reference voltage source for generating the reference voltage and a reference voltage output terminal for outputting the reference voltage, and
wherein one ends of the first group of sensors and the second group of sensors are coupled to the reference voltage output terminal.

9. A semiconductor device comprising:
a first group of sensor coupling terminals to which a first group of sensors are coupled;
a second group of sensor coupling terminals to which a second group of sensors are coupled;
a first switch group which selectively outputs a signal input from the first group of sensor coupling terminals and a reference voltage, from an output terminal;
a second switch group which selectively outputs a signal input from the second group of sensor coupling terminals and the reference voltage, from an output terminal;
a switch control circuit which controls the first switch group and the second switch group to select one sensor included in the first group of sensors or the second group of sensors;
a differential amplifier which has a first input terminal coupled to the output terminal of the first switch group and a second input terminal coupled to the output terminal of the second switch group, and amplifies and outputs a differential voltage between the first input terminal and the second input terminal; and
a signal process circuit which performs a signal process for an output signal of the differential amplifier,
wherein a number of switches included in the first switch group is equal to a number of switches included in the second switch group, and
wherein, when to select a sensor included in the first group of sensors, the switch control circuit controls to select any of signals input from the first group of sensor coupling terminals in the first switch group and to select the reference voltage in the second switch group, and when to select a sensor included in the second group of sensors, the switch control circuit controls to select any of signals input from the second group of sensor coupling terminals in the second switch group and to select the reference voltage in the first switch group.

10. The semiconductor device according to claim 9,
wherein the first switch group includes at least one sensor coupling switch one end of which is coupled to the first group of sensor coupling terminals and other end thereof is coupled to the first input terminal, and a first bias voltage switch one end of which is coupled to the reference voltage and other end thereof is coupled to the first input terminal,
wherein the second switch group includes at least one sensor coupling switch one end of which is coupled to the second group of sensor coupling terminals and other end thereof is coupled the second input terminal, and a second bias voltage switch one end of which is coupled to the reference voltage and other end thereof is coupled to the second input terminal.

11. The semiconductor device according to claim 10,
wherein the first group of sensor coupling terminals and the second group of sensor coupling terminals include dummy sensor coupling terminals coupled to dummy sensors and supplied with the reference voltage,
wherein one ends of the first bias voltage switch and the second bias voltage switch are coupled to the reference voltage respectively through the dummy sensor coupling terminals and the dummy sensors.

12. The semiconductor device according to claim 11, further comprising
a dummy impedance circuit between one ends of the first bias voltage switch and the second bias voltage switch and the dummy sensor coupling terminal.

13. The semiconductor device according to claim 12,
wherein an impedance value of the dummy impedance circuit is set based on a variation of impedance which is generated by generating a mutual interaction between sensors used in the first group of sensors and the second group of sensors and a target object to be measured.

14. The semiconductor device according to claim 10, further comprising
a dummy impedance circuit between the first bias voltage switch and the reference voltage and also between the second bias voltage switch and the reference voltage.

15. The semiconductor device according to claim 14,
wherein an impedance value of the dummy impedance circuit is set based on an impedance value of the first group of sensors and the second group of sensors and a variation of impedance which is generated by a mutual interaction between the sensors and a target object to be measured.

16. The semiconductor device according to claim 14,
wherein the dummy impedance circuit is arranged individually between the first bias voltage switch and the reference voltage and also between the second bias voltage switch and the reference voltage.

17. The semiconductor device according to claim 14,
wherein the dummy impedance circuit is arranged commonly between the first bias voltage switch and the reference voltage and between the second bias voltage switch and the reference voltage.

18. The semiconductor device according to claim 14,
wherein the dummy impedance circuit has a configuration in which an impedance value is variable.

19. The semiconductor device according to claim 18, further comprising
an impedance control circuit which controls an impedance value of the dummy impedance circuit.

20. The semiconductor device according to claim 19,
wherein, in a state where the switch control circuit selects the sensor, the impedance control circuit calibrates an impedance value of the dummy impedance circuit in a manner that an amplitude of an output signal of the differential amplifier is a constant value, and stores control information of the dummy impedance circuit which has been obtained by the calibration in a memory.

\* \* \* \* \*